US007996003B2

(12) United States Patent
Maeda et al.

(10) Patent No.: US 7,996,003 B2
(45) Date of Patent: Aug. 9, 2011

(54) INTEGRATED CIRCUIT AND DEVICE FOR MOBILE COMMUNICATIONS

(75) Inventors: Koji Maeda, Kokubunji (JP); Satoshi Tanaka, Kokubunji (JP); Taizo Yamawaki, Tokyo (JP); Yukinori Akamine, Kokubunji (JP); Masahiro Ito, Kokubunji (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 897 days.

(21) Appl. No.: 11/940,733

(22) Filed: Nov. 15, 2007

(65) Prior Publication Data
US 2008/0113625 A1 May 15, 2008

(30) Foreign Application Priority Data
Nov. 15, 2006 (JP) .................. 2006-308821

(51) Int. Cl.
*H04W 24/00* (2009.01)
*H04B 17/00* (2006.01)
(52) U.S. Cl. .................. 455/423; 455/67.11; 455/115.1; 455/226.1
(58) Field of Classification Search .................. 455/423, 455/67.11, 115.1, 226.1
See application file for complete search history.

(56) References Cited

U.S. PATENT DOCUMENTS

| 5,835,850 | A | 11/1998 | Kumar | |
|---|---|---|---|---|
| 6,137,999 | A | 10/2000 | Lovelace et al. | |
| 7,130,589 | B2 * | 10/2006 | Lee et al. | 455/67.11 |
| 7,715,836 | B2 * | 5/2010 | Vassiliou et al. | 455/423 |
| 2004/0219884 | A1 * | 11/2004 | Mo et al. | 455/67.11 |
| 2006/0068739 | A1 | 3/2006 | Maeda et al. | |
| 2007/0080835 | A1 | 4/2007 | Maeda et al. | |
| 2007/0213022 | A1 * | 9/2007 | Darabi | 455/232.1 |

FOREIGN PATENT DOCUMENTS

| JP | 10-93488 A | 4/1998 |
|---|---|---|
| JP | 11-251947 A | 9/1999 |
| JP | 2004-40678 A | 2/2004 |
| JP | 2006-101388 A | 4/2006 |
| JP | 2007-104522 A | 4/2007 |

OTHER PUBLICATIONS

J. Chabloz et al., "A Novel I/Q Mismatch Compensation Scheme for a Low-IF Receiver Front-End," Proceedings of the International Symposium on Circuits and Systems (ISCAS 2004), 2004, vol. 4, pp. 453-456.
L. Der, "A 2GHz CMOS Image-Reject Receiver with LMS Calibration," IEEE Journal of Solid-State Circuits, vol. 38, No. 2, Feb. 2003, pp. 167-175.

* cited by examiner

*Primary Examiner* — Wen Huang
(74) *Attorney, Agent, or Firm* — Miles & Stockbridge P.C.

(57) ABSTRACT

When generating an RF test signal for mismatch calibration for receiver in order to calibrate reception mismatch of an I-phase signal and a Q-phase signal that are output from demodulated signal processing circuits coupled to mixers for receiving, a Tx VCO avoids covering the higher frequency of an RF received signal in an FDD system. An RF test signal generating unit generates, in a calibration mode of a mismatch calibration for receiver circuit, the RF test signal by using an oscillation output signal of the Tx VCO and other circuits, and supplies the same to the mixers for receiving via a switch. The RF test signal has a frequency within an RF reception frequency band that is higher than that of an RF transmission signal with the maximum frequency band of multiband radio frequency communications. By switching the switch in a reception mode, an output of a low-noise amplifier that amplifies the RF received signal received by an antenna is supplied to each of the mixers for receiving.

13 Claims, 8 Drawing Sheets

INTEGRATED CIRCUIT AND DEVICE FOR MOBILE COMMUNICATIONS

CLAIM OF PRIORITY

The present application claims priority from Japanese application JP 2006-308821 filed on Nov. 15, 2006, the content of which is hereby incorporated by reference into this application.

FIELD OF THE INVENTION

The present invention relates to a radio frequency integrated circuit and a wireless communication terminal device using the same, and particularly to a useful technique for generating a test signal for calibrating mismatch of a received signal, such as mismatch of the amplitudes and phases of an in-phase component signal I and a quadrature component signal Q in an orthogonal demodulated signal.

BACKGROUND OF THE INVENTION

Ubiquitous coverage which is the capability of a communication terminal device such as a mobile phone terminal that allows for wireless communications anywhere in the world is not practically used now, but is currently being developed.

These mobile systems include cellulars of GSM, GPRS, EDGE, WCDMA, DCS, and PCS. In the characteristics of these systems, there are increased demands for a multiband and a multimode with multiplex combinations in a wide range such as combinations between a constant envelope curve signal and a changed envelope curve signal, and between time division and code division. It should be noted that GSM is an abbreviation of Global System for Mobile Communication, GPRS is an abbreviation of General Packet Radio Service, EDGE is an abbreviation of Enhanced Data for GSM Evolution; Enhanced Data for GPRS, WCDMA is an abbreviation of Wideband Code Division Multiple Access, DCS is an abbreviation of Digital Cellular System, and PCS is an abbreviation of Personal Communication System.

Patent document 1 described below discloses a radio frequency transceiver incorporating a self-test function. The transceiver receives a signal at any one of a low RF band from 824 to 849 MHz and a high RF band from 869 to 894 MHz. On the other hand, the transceiver transmits a signal at a high RF band from 869 to 894 MHz. A transmitter of the transceiver supplies a specially-coded test signal at a low RF band from 824 to 849 MHz to a receiver of the transceiver. When the test signal is correctly received by the receiver, it can be determined that transmission and routes of receiving routes of receiving routes of receiving routes of receiving of the transceiver are correctly operated.

Patent document 2 described below discloses a technique by which the phases and amplitudes of an I-signal and a Q-signal that are orthogonally demodulated by a low IF (low intermediate-frequency) receiver that converts an RF received signal into a low IF signal are adjusted and unnecessary images are removed. In a calibration mode, an output signal of a transmission voltage controlled oscillator is supplied to a quadrature mixer for adjustment of the phases and amplitudes.

In addition, patent document 3, non-patent document 1, and non-patent document 2 described below disclose a demodulation device in which phase mismatch of an I-phase signal and a Q-phase signal that are demodulated by an orthogonal demodulation circuit is compensated by a phase mismatch compensation circuit, and amplitude mismatch of the I-phase signal and the Q-phase signal is compensated by an amplitude mismatch compensation circuit coupled to an output of the orthogonal demodulation circuit.

[Patent Document 1] Japanese patent laid-open No. Hei 10(1998)-93488

[Patent Document 2] Japanese patent laid-open No. Hei 11(1999)-251947

[Patent Document 3] Japanese patent laid-open No. 2004-40678

[Non-patent Document 1] Jeremie Chabloz et al, "A NOVEL I/Q MISMATCH COMPENSATION SCHEME FOR A LOW-IF RECEIVER FRONT-END", Proceedings of the International Symposium on Circuits and Systems (ISCAS 2004), vol. 4, pp. 453-456, 2004 [Non-patent Document 2] Lawrence Der et al, "A 2-GHz CMOS Image-Reject Receiver With LMS Calibration", IEEE JOURNAL OF SOLID-STATE CIRCUITS, VOL. 38, No. 2, FEBRUARY 2003, pp. 167-175

SUMMARY OF THE INVENTION

In order to calibrate the mismatch of the received signal, such as the mismatch of the amplitude and phase components of the I-phase signal and the Q-phase signal in the receiver of the wireless communication terminal device with high accuracy in a short period of time, a test signal having a frequency within a receiving band is needed. In the patent document 2, when calibrating the mismatch of the received signal, such as the mismatch of the amplitudes and phases of the I-phase signal and the Q-phase signal, a test signal at an RF receiving band is generated from a transmission voltage controlled oscillator (Tx-VCO) and is supplied to a quadrature mixer circuit of a receiver.

On the other hand, in major wireless systems such as WCDMA, GSM850, GSM900, DCS1800, and PCS1900, an FDD system is employed, so that the frequency of the RF receiving band of the wireless communication terminal is set higher than that of the RF transmission band. Accordingly, the RF transmission frequencies at which a plurality of wireless communication terminals communicate with a base station in the uplink can be set lower than the RF transmission frequencies (RF receiving frequencies of the wireless communication terminals) at which the base station communicate with the wireless communication terminals in the downlink. As a result, the configurations of the transmission voltage controlled oscillators (Tx-VCO) of the wireless communication terminals are simplified, and the wireless communication terminals can be manufactured at low cost. It should be noted that FDD is an abbreviation of Frequency Division Duplex.

However, as described in the patent document 2, the study of the inventors clarifies that generating of the RF test signal for mismatch calibration for receiver from the transmission voltage controlled oscillator (Tx-VCO) involves the following problems.

The problems are as follows. Since the RF transmission frequency of the wireless communication terminal in the FDD system can be set lower than the RF reception frequency as described above, a plurality of wireless communication terminals can be manufactured at low cost. However, in the case of generating the RF test signal for mismatch calibration for receiver from the Tx VCO, it is necessary for the Tx VCO to cover not only the lower RF transmission frequency, but also the higher RF reception frequency. For this coverage, the capacitance value of a parasitic capacity of the Tx VCO needs to be sufficiently reduced lower than the capacitance value of a variable capacity element controlled by a frequency controlling signal. In general, the receiver of the wireless communication terminal needs to output the RF transmission signal at a higher level than the RF received signal, and thus the power consumption of the Tx VCO is larger as compared to that of a voltage-controlled oscillator for receiver (Rx-VCO). As described above, in order for the Tx VCO to cover not only the lower RF transmission frequency, but also the higher RF reception frequency, the parasitic capacity of the oscillator needs to be reduced, and the power consumption thereof is large. Further, in the case where the oscillation frequency of the Tx VCO is extremely closer to that of the Rx-VCO in a direct conversion transmission/reception device, there is a possibility that two voltage controlled oscillators cause injection lock, and thus the S/N ratio of the RF test signal is extremely deteriorated.

Prior to the present invention, the inventors worked on developing an RF-analog-signal processing integrated circuit (RF IC) that enables communications of the WCDMA system. In the development, it was studied to generate the test signal for mismatch calibration for receiver, not from the transmission voltage controlled oscillator (Tx-VCO), but from the voltage-controlled oscillator for receiver (Rx-VCO) that was supposed to cover the higher RF reception frequency.

FIG. 3 is a diagram showing transmission/receiving bands of Band1, Band2 and Band 5 in the WCDMA system in the UMTS standard. It should be noted that UMTS is an abbreviation of Universal Mobile Telecommunication System.

Specifically, in the case of Band5 (U.S region) that has the lowest frequency band in the WCDMA system in the UMTS standard, the frequency band of the RF transmission signal TX of the wireless communication terminal ranges from 824 to 849 MHz, whereas the frequency band of the RF received signal RX of the wireless communication terminal ranges from 869 to 894 MHz. As similar to the above, in the case of Band2 (Europe region) in the WCDMA system, the frequency band of the RF transmission signal TX of the wireless communication terminal ranges from 1850 to 1910 MHz, whereas the frequency band of the RF received signal RX of the wireless communication terminal ranges from 1930 to 1990 MHz. Further, in the case of Band1 (U.S region) that has the highest frequency band in the WCDMA system in the UMTS standard, the frequency band of the RF transmission signal TX of the wireless communication terminal ranges from 1920 to 1980 MHz, whereas the frequency band of the RF received signal RX of the wireless communication terminal ranges from 2110 to 2170 MHz. As described above, the receiving band frequency RX is higher than the transmission band frequency TX in any frequency band.

Thus, the test for mismatch calibration for receiver of the RF IC has to be executed for all bands, and the test conditions in Band1, having the highest frequency in the WCDMA system, are the severest from the viewpoint of the oscillation frequency of the voltage controlled oscillator. It was studied to generate the RF test signal for mismatch calibration for receiver of the frequency band Band1 at this time from the voltage-controlled oscillator for receiver (Rx-VCO) that oscillates the RF received signal RX whose frequency band ranges from 2110 to 2170 MHz.

FIG. 1 is a block diagram showing an RF IC that was developed prior to the present invention by the inventors. The RF IC is configured to generate the test signal for mismatch calibration for receiver from the voltage-controlled oscillator for receiver (Rx-VCO). Specifically, the RF IC includes a low-noise amplifier 1, a band-pass filter 25, mixers for receiving 3 and 4, low-pass filters 5, 6, 11 and 12, variable gain amplifiers 7 and 8, A/D converters 9 and 10, a gain control circuit 16, a 90-degree phase shifter 17, a divider 18, and a voltage-controlled oscillator for receiver (Rx-VCO) 19. In addition, the RF IC includes, for the test of mismatch calibration for receiver, a switch 2, a mismatch calibration for receiver circuit 13, and a test signal generating mixer 39.

In a reception mode of the RF IC, an RF received signal of the WCDMA system received by an antenna ANT of a wireless communication terminal such as a mobile phone is amplified by the low-noise amplifier 1, and then is supplied to one input terminal of each of the mixers for receiving 3 and 4 via the band-pass filter 25 and the switch 2. An oscillation output signal from the voltage-controlled oscillator for receiver (Rx-VCO) 19 is supplied to the divider 18, and an output signal of the divider 18 is supplied to the 90-degree phase shifter 17. Local signals for receiver from the output of the divider 18 and the output of the 90-degree phase shifter 17 are supplied to the other input terminal of each of the mixers for receiving 3 and 4, so that an I-phase analog baseband signal and a Q-phase analog baseband signal are generated from outputs of the mixers for receiving 3 and 4. The I-phase and Q-phase analog baseband signals are supplied to the A/D converters 9 and 10 via the low-pass filters 5 and 6 and the variable gain amplifiers 7 and 8. I-phase and Q-phase digital baseband signals Rx_DBBS_I and Rx_DBBS_Q are generated from outputs of the A/D converters 9 and 10. Reception mismatch of the I-phase and Q-phase digital baseband signals Rx_DBBS_I and Rx_DBBS_Q is calibrated by the mismatch calibration for receiver circuit 13, and then the I-phase and Q-phase digital baseband received signals are supplied to a baseband signal processing LSI (BB_LSI) (not shown). The frequency band of the I-phase and Q-phase analog baseband signals from the outputs of the mixers for receiving 3 and 4 adapted to the WCDMA system is a wide band of approximately 2 MHz. Accordingly, the cut-off frequency of the low-pass filters 5 and 6 is also set to approximately 2 MHz.

Under the condition where the RF signal having a constant amplitude and a constant phase is supplied to the mixers for receiving 3 and 4, the I-phase and Q-phase digital baseband signals output from the A/D converters 9 and 10 are ideally the same in amplitude, and are different in phase from each other by 90 degrees. This is because one reception mixer 3 and the other reception mixer 4 perform sampling of the RF signal having a constant amplitude and a constant phase at a timing of the reception local signal with 0-degree phase output from the divider 18 and at a timing of the reception local signal with 90-degree phase output from the 90-degree phase shifter. However, in the actual RF IC, element irregularities due to the manufacturing process cause circuit irregularities for each of the mixers for receiving 3 and 4, the low-pass filters 5 and 6, the variable gain amplifiers 7 and 8, and the A/D converters 9 and 10. Therefore, the reception mismatch, such as the mismatch of the amplitude and phase, is added to the I-phase and Q-phase baseband signals output from the A/D converters 9 and 10.

FIG. 2 is a diagram showing deterioration of constellation in the case where the mismatch is added to the amplitudes and phases of the I-phase and Q-phase baseband signals. In the case where no circuit irregularities are caused in the RF IC, an ideal sine wave and an ideal cosine wave are obtained as the I-phase and Q-phase baseband signals, so that the constellation forms the perfect circle as shown in FIG. 2A. On the other hand, in the case where the phase mismatch or the amplitude mismatch is added, the constellation forms imperfect circle as shown in FIGS. 2B and 2C, and thus amplitude and phase information is deteriorated. In the case of performing communications utilizing not only phase modulation, but also amplitude modulation in order to realize a high communication transfer rate as in the WCDMA system and the EDGE system, the deterioration of the amplitude and phase information causes a serious effect. Specifically, the mismatch of the I-phase and Q-phase baseband signals extremely deteriorates the communication quality of the WCDMA system and the EDGE system utilizing not only phase modulation, but also amplitude modulation. Accordingly, in order to realize the RF IC for performing communications of high communication-quality in the WCDMA system and the EDGE system, it is necessary to calibrate the mismatch of the I-phase and Q-phase baseband signals in "calibration mode" prior to "transmission/reception mod". Thus, by calibration of the mismatch in "calibrationmode" prior to "transmission/receptionmode", the reception mismatch of the I-phase and Q-phase digital baseband signals from the A/D converters 9 and 10 can be calibrated by the mismatch calibration for receiver circuit 13 in "reception mode".

In the calibration mode of the RF IC, the RF test signal for mismatch calibration for receiver within the band from 2110 to 2170 MHz of the frequency band Band1 that has the highest frequency band in the WCDMA system for which the test conditions are the severest is formed by the voltage-controlled oscillator for receiver (Rx-VCO) 19 and the divider 18. The RF test signal for mismatch calibration for receiver is supplied to one input terminal of each of the mixers for receiving 3 and 4 via the test signal generating mixer 39 and the switch 2. The number of frequency divisions of the divider 18 is set to 2 and the calibration-mode oscillation frequency that is oscillated from the voltage-controlled oscillator for receiver (Rx-VCO) 19 is set to 4.28 GHz. Thus, a signal at 2.14 GHz within the frequency band of Band1 of the WCDMA system is supplied to one input terminal of the test signal generating mixer 39. In this state, the amplitude mismatch and the phase mismatch of the I-phase and Q-phase baseband signals are supposed to be calibrated by the mismatch calibration for receiver circuit 13, as described in the patent document 3, non-patent document 1 and non-patent document 2.

However, according to the study of the inventors, when the RF test signal for mismatch calibration for receiver is generated from the voltage-controlled oscillator for receiver (Rx-VCO) as shown in FIG. 1, it has been found that the phase mismatch can not be correctly detected prior to the phase mismatch calibration, and thus the phase mismatch can not be correctly calibrated.

Specifically, since the frequency band of the analog baseband signal in the WCDMA system is approximately 2 MHz as described above, 1 MHz that is half the analog baseband signal is set as the frequency of a demodulated test signal output from each of the mixers for receiving 3 and 4. Accordingly, a modulated signal $LO_{IF}$ at 1 MHz is supplied to the other input terminal of the test signal generating mixer 39. As a result, a signal at 2141 MHz (2.14 GHz+1 MHz) and a signal at 2139 MHz (2.14 GHz−1 MHz) are generated from the output of the test signal generating mixer 39.

The RF test signals at 2139 MHz and at 2141 MHz output from the test signal generating mixer 39 are supplied to one input terminal of each of the mixers for receiving 3 and 4 via the switch 2, and a signal at 2140 MHz is supplied to the other input terminal of each of the mixers for receiving 3 and 4 from the output of the divider 18. Accordingly, from the outputs of the mixers for receiving 3 and 4, demodulated test signals of a sine wave and a cosine wave with +1 MHz and −1 MHz are output. The cutoff frequency of the low-pass filters 5 and 6 is set to approximately 2 MHz. Thus, the demodulated test signals from the outputs of the mixers for receiving 3 and 4 are supplied to the mismatch calibration for receiver circuit 13 via the low-pass filters 5 and 6, the variable gain amplifiers 7 and 8, the A/D converters 9 and 10, and the low-pass filters 11 and 12. During the time when the demodulated test signals of a sine wave and a cosine wave with +1 MHz and −1 MHz output from the mixers for receiving 3 and 4 pass through the above-described circuits, the directions of the phase rotations of the sine wave and the cosine wave with +1 MHz and −1 MHz are opposite. As a result, the study of the inventors has posed a malfunction problem in which the phase mismatch of the sine wave and the cosine wave with +1 MHz and −1 MHz caused by the mismatch calibration for receiver circuit 13 is present in each of positive and negative fields, the phase mismatch can not be correctly detected prior to the phase mismatch calibration, and thus the phase mismatch can not be correctly calibrated.

Accordingly, the present invention has been achieved based on the study that was made prior to the present invention by the inventors. An object of the present invention is that, when generating the RF test signal for mismatch calibration for receiver in order to calibrate the reception mismatch of the I-phase signal and Q-phase signal that are output from the demodulated signal processing circuits coupled to the mixers for receiving, the Tx VCO avoids covering the higher frequency of the RF received signal. Further, another object of the present invention is to avoid a malfunction in the mismatch calibration for receiver when generating the RF test signal for mismatch calibration for receiver.

The following is a brief explanation of a representative invention disclosed in this application.

Specifically, in the radio frequency integrated circuit, the RF test signal generating unit generates an RF test signal having a frequency within an RF reception frequency band that is higher than that of an RF transmission signal having the maximum frequency band in multiband radio frequency communications by utilizing an oscillation output signal of the Tx VCO and the other circuits. Thus, it is possible that when generating the RF test signal for mismatch calibration for receiver, the Tx VCO can avoid covering not only the lower frequency of the RF transmission signal, but also the higher frequency of the RF received signal.

The following is a brief explanation of an effect obtained by a representative invention disclosed in this application.

Specifically, when generating the RF test signal for mismatch calibration for receiver in order to calibrate the reception mismatch of the I-phase signal and Q-phase signal that are output from the demodulated signal processing circuits coupled to the mixers for receiving, the Tx VCO can avoid covering the higher frequency of the RF received signal.

DETAILED DESCRIPTION OF THE PREFERRED EMBODIMENTS

Representative Embodiments

Figure 1:
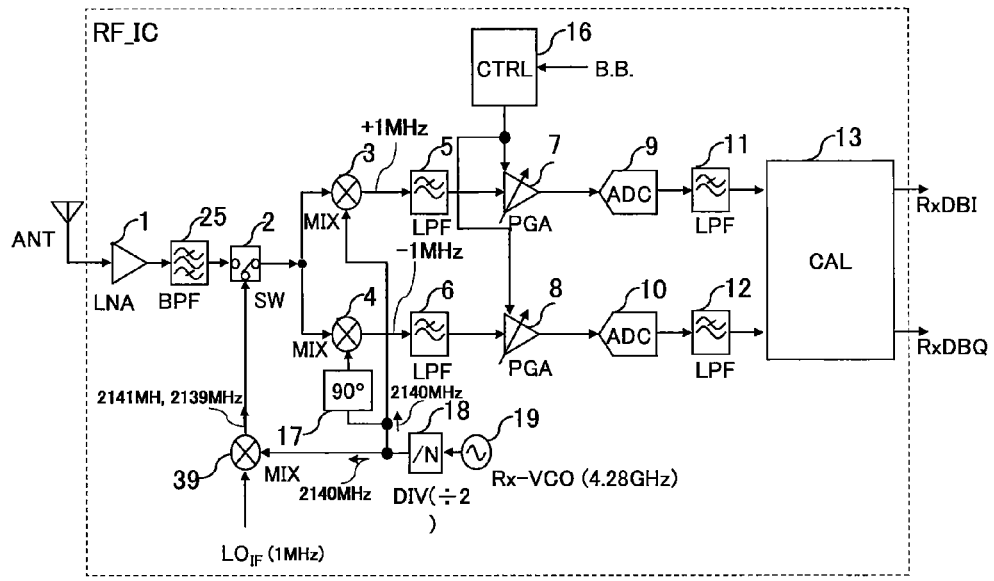
FIG. 1 is a block diagram showing an RF IC that was developed prior to the present invention by the inventors.
Figure 2A:
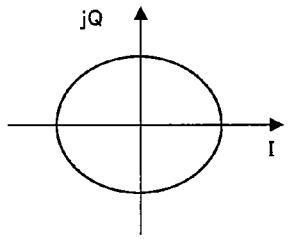
FIGS. 2A, 2B, and 2C are diagrams, each showing deterioration of constellation in the case where mismatch is added to the amplitudes and phases of I-phase and Q-phase baseband signals.
Figure 2B:
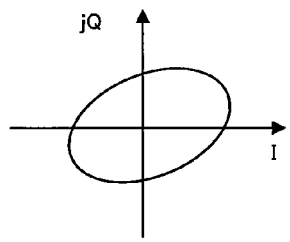
Figure 2C:
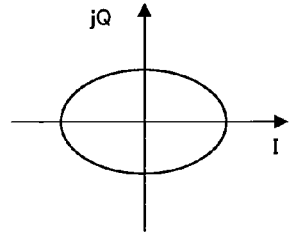

First of all, the general outline of representative embodiments of the present invention disclosed in this application will be described. It should be noted that parenthetic reference numerals of the drawings which are referred to in the outlined description for the representative embodiments merely exemplify constituent elements included in the concept of the constituent elements to which the reference numerals are given.

Figure 3:
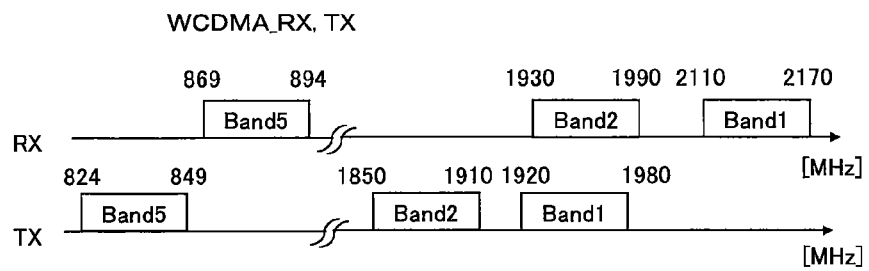
FIG. 3 is a diagram showing the transmission/receiving bands of Band1, Band2, and Band5 in the WCDMA system in the UMTS standard.

[1] A radio frequency integrated circuit (RF IC) according to the representative embodiments of the present invention is mounted in a wireless communication terminal and has a function of performing multiband radio frequency communications with a base station (see FIG. 3).

Figure 4:
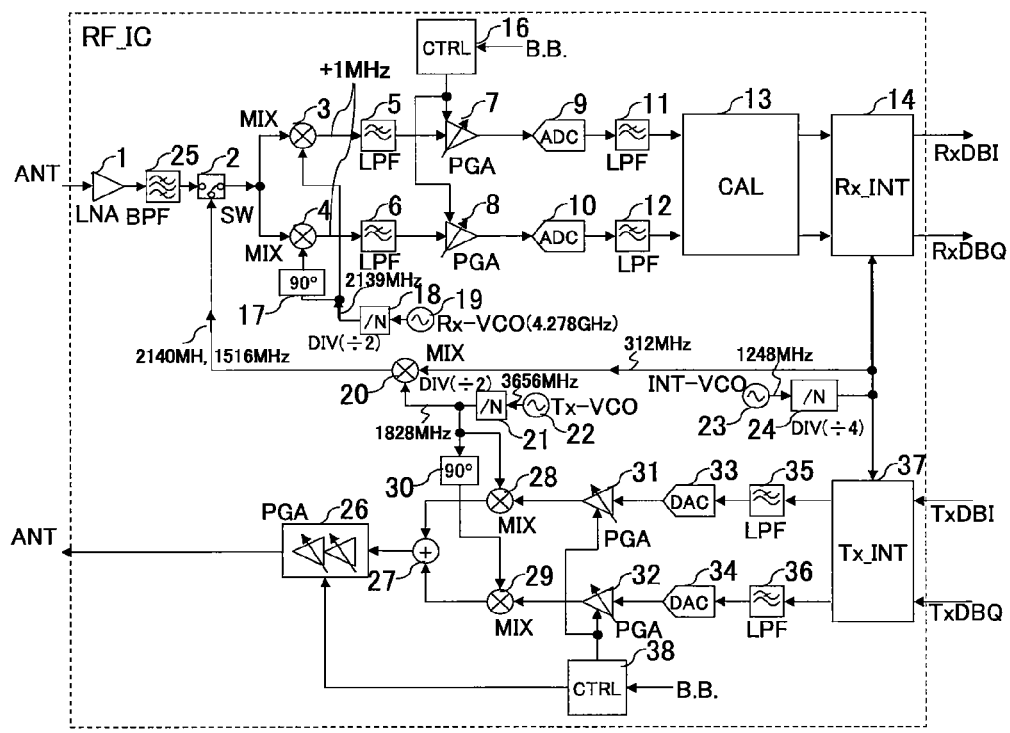
FIG. 4 is a block diagram showing an RF IC according to an embodiment of the present invention.

The radio frequency integrated circuit includes a low-noise amplifier (1), mixers for receiving (3) and (4), a voltage-controlled oscillator for receiver (Rx-VCO 19), demodulated signal processing circuits (5), (6), (7), (8), (9), (10), (11) and (12), and a mismatch calibration for receiver circuit (13) (see FIG. 4).

The low-noise amplifier amplifies an RF received signal received by an antenna (ANT) of the wireless communication terminal.

The RF amplified signal of the low-noise amplifier is supplied to one input terminal of each of the mixers for receiving, and a reception local signal in accordance with an oscillation output of the voltage-controlled oscillator for receiver is supplied to the other input terminal of each of the mixers for receiving. The demodulated signal processing circuits process orthogonal demodulated received signals from output terminals of the mixers for receiving. The RF received signal (RX) with the maximum frequency band (Band1) having the maximum frequency among a plurality of frequency bands of the multiband radio frequency communications can be processed by the mixers for receiving and the demodulated signal processing circuits in a reception mode of the integrated circuit.

The mismatch calibration for receiver circuit calibrates mismatch of the orthogonal demodulated received signals from output terminals of the demodulated signal processing circuits in a calibration mode of the integrated circuit.

The integrated circuit further includes modulated signal processing circuits (35), (36), (33), (34), (31) and (32), transmission mixers (28) and (29), and a transmission voltage controlled oscillator (Tx-VCO 22) (see FIG. 4).

The modulated signal processing circuits process an orthogonal transmission signal.

An orthogonal transmission output signal of the modulated signal processing circuits is supplied to one input terminal of each of the transmission mixers, and a transmission local signal in accordance with an oscillation output of the transmission voltage controlled oscillator is supplied to the other input terminal of each of the transmission mixers. An RF transmission signal (TX) with the maximum frequency band of the multiband radio frequency communications can be generated from outputs of the mixers for receiving in accordance with the oscillation output of the transmission voltage controlled oscillator in a transmission mode of the integrated circuit.

The integrated circuit further includes an RF test signal generating unit (20) which generates an RF test signal for mismatch calibration performed by the mismatch calibration for receiver circuit in the calibration mode of the integrated circuit and supplies the RF test signal to one input terminal of each of the mixers for receiving.

The RF test signal generating unit generates the RF test signal by using the oscillation output signal of the transmission voltage controlled oscillator in the calibration mode.

The RF test signal generated by the RF test signal generating unit in the calibration mode has a frequency within the RF reception frequency band of the RF received signal that is higher than that of the RF transmission signal with the maximum frequency band among a plurality of frequency bands of the multiband radio frequency communications.

Therefore, according to the embodiment, the RF test signal generating unit can generate, in the calibration mode, the RF test signal having a frequency within the RF reception frequency band that is higher than that of the RF transmission signal with the maximum frequency band by using the oscillation output signal of the transmission voltage controlled oscillator. Accordingly, when generating the RF test signal for mismatch calibration for receiver, it is possible for the Tx VCO to avoid covering not only the lower frequency of the RF transmission signal, but also the higher frequency of the RF received signal.

As a preferable mode, the frequency of the RF received signal and the frequency of the RF transmission signal with the maximum frequency band of the multiband radio frequency communications are set to approximately 2110 MHz to 2170 MHz and approximately 1920 MHz to 1980 MHz of the WCDMA system, respectively (see FIG. 3).

As a more preferable mode, the integrated circuit further includes the other low-noise amplifiers (LNAs 1 to 4), the other mixers for receiving (RX-MIX_I and RX-MIX_Q), and the other demodulated signal processing circuits (PGAIs 1 to 3 and PGAQs 1 to 3). The other low-noise amplifiers are configured to amplify an RF received signal of any system, among GSM850, GSM900, DCS1800 and PCS1900, which is received by the antenna of the wireless communication terminal. The RF amplified signal of the other low-noise amplifiers is supplied to one input terminal of each of the other mixers for receiving, and the reception local signal in accordance with the oscillation output of the voltage-controlled oscillator for receiver is supplied to the other input terminal of each of the other mixers for receiving. The other demodulated signal processing circuits process the other orthogonal demodulated received signals from output terminals of the other mixers for receiving. An RF received signal of the PCS1900 system can be processed by the other mixers for receiving and the other demodulated signal processing circuits in the reception mode of the integrated circuit. The mismatch calibration for receiver circuit calibrates mismatch of the orthogonal demodulated received signals from output terminals of the other demodulated signal processing circuits in the calibration mode of the integrated circuit. The integrated circuit further includes the other transmission mixers and a transmission-system offset PLL circuit. The modulated signal processing circuits are configured to process an orthogonal transmission signal of any system among GSM850, GSM900, DCS1800 and PCS1900. The orthogonal transmission output signal of any system, among GSM850, GSM900, DCS1800 and PCS1900, which is output from the modulated signal processing circuits is supplied to one input terminal of each of the other transmission mixers. An intermediate frequency signal is supplied to the other input terminal of each of the other transmission mixers, and an intermediate frequency transmission signal output from the other transmission mixers is supplied to an input of the transmission-system offset PLL circuit. An RF transmission signal of any system among GSM850, GSM900, DCS1800 and PCS1900 can be generated from an output of the transmission-system offset PLL circuit in the transmission mode of the integrated circuit. The RF test signal, having a frequency of approximately 1930 MHz to 1990 MHz that is the frequency of the RF received signal of the PCS1900 system, generated by the RF test signal generating unit in the calibration mode of the integrated circuit is supplied to the other input terminal of each of the mixers for receiving (see FIG. 8).

As a much more preferable mode, each of the modulated signal processing circuits is configured by any one of a polar loop system and a polar modulator system adapted to an EDGE system in which amplitude modulation as well as phase modulation is utilized. The transmission-system offset PLL circuit includes a phase loop (PM LP) for phase modulation of any one of the polar loop system and the polar modulator system and an amplitude loop (AM LP) for amplitude modulation of any one of the polar loop system and the polar modulator system (see FIGS. 11 and 12).

As a concrete mode, the demodulated signal processing circuits of the integrated circuit include A/D converters that convert the analog signals of the orthogonal demodulated received signals from the output terminals of the mixers for receiving into the digital signals. The demodulated signal processing circuits of the integrated circuit include D/A converters that convert the digital signals of the orthogonal transmission output signals of the modulated signal processing circuits into the analog signals. The integrated circuit includes digital interfaces (14) and (37) which output the orthogonal demodulated received signals of the digital signals to an LSI that performs baseband signal processing and to which the orthogonal transmission output signals of the digital signals are supplied from the LSI. The integrated circuit further includes digital interface reference signal generating units (23) and (24) which generate a digital interface reference signal supplied to the digital interfaces. The RF test signal generating unit generates the RF test signal by using the oscillation output signal of the transmission voltage controlled oscillator and the output signal of the digital interface reference signal generating units in the calibration mode (see FIG. 4).

As another concrete mode, the integrated circuit further includes a system reference voltage controlled oscillator (DCX-VCO 40) which generates a system reference signal used when generating the reception local signal and the transmission local signal. The RF test signal generating unit generates the RF test signal by using the oscillation output signal of the transmission voltage controlled oscillator and the oscillation output signal of the system reference voltage controlled oscillator in the calibration mode (see FIG. 5).

As still another concrete mode, the integrated circuit further includes a fractional divider (42) in which the number of frequency divisions includes a fraction and whose input is coupled to an output of the transmission voltage controlled oscillator. The RF test signal generating unit generates the RF test signal from an output of the fractional divider to the input of which the oscillation output signal of the transmission voltage controlled oscillator is supplied (see FIG. 6).

As another concrete mode, the integrated circuit further includes a controlling circuit (43) which controls the transmission voltage controlled oscillator in the calibration mode. The frequency of the oscillation output signal of the transmission voltage controlled oscillator is controlled in the calibration mode so as to be lower than that of the oscillation output signal of the transmission voltage controlled oscillator, in any frequency band among a plurality of frequency bands of the multiband radio frequency communications. In the calibration mode, the RF test signal generating unit generates, as the RF test signal, the oscillation output signal of the transmission voltage controlled oscillator which is controlled by the controlling circuit in the calibration mode (see FIG. 7).

[2]

A Radio frequency integrated circuit according to another viewpoint is mounted in a wireless communication terminal and has a function of performing multiband radio frequency communications with a base station. In the integrated circuit, frequency up-conversion from the orthogonal transmission signal from the LSI that performs baseband signal processing into the RF transmission signal is performed by the transmission mixers (28) and (29), and frequency down-conversion from the RF received signal received by the antenna into the orthogonal demodulated received signal is performed by the mixers for receiving (3) and (4). In the frequency up-conversion, the transmission local signal in accordance with an output of the transmission voltage controlled oscillator (22) is supplied to the transmission mixers. In the frequency down-conversion, the reception local signal in accordance with an output of the voltage-controlled oscillator for receiver (19) is supplied to the mixers for receiving. The orthogonal demodulated reception output signals are generated from outputs of the mixers for receiving by the demodulated signal processing circuits.

The integrated circuit includes the RF test signal generating unit (20) which generates the RF test signal in the calibration mode of the integrated circuit and supplies the same to the mixers for receiving.

The integrated circuit includes the mismatch calibration for receiver circuit (13) which calibrates mismatch of the received orthogonal-demodulated signals of the demodulated signal processing circuits in accordance with outputs of the mixers for receiving to which the RF test signal is supplied in the calibration mode of the integrated circuit. Accordingly, the mismatch calibration for receiver circuit reduces mismatch of the received orthogonal-demodulated signals of the demodulated signal processing circuits in accordance with the outputs of the mixers for receiving that respond to the RF received signal in the reception mode of the integrated circuit.

The RF test signal generating unit generates the RF test signal by using the oscillation output signal of the transmission voltage controlled oscillator in the calibration mode.

The RF test signal generated by the RF test signal generating unit in the calibration mode has a frequency within the RF reception frequency band of the RF received signal that is higher than that of the RF transmission signal with the maximum frequency band among a plurality of frequency bands of the multiband radio frequency communications (see FIG. 4).

[3]

A wireless communication terminal device, according to another embodiment of the present invention, having a function of performing multiband radio frequency communications with a base station includes the LSI that performs baseband signal processing and the radio frequency integrated circuit (RF_IC). In the integrated circuit, frequency up-conversion from the orthogonal transmission signal from the LSI into the RF transmission signal is performed by the transmission mixers (28) and (29), and frequency down-conversion from the RF received signal received by the antenna into the orthogonal demodulated received signal is performed by the mixers for receiving (3) and (4). The wireless communication terminal device further include power amplifiers (HPAs land 2, and W_PAs 1 and 2) and an antenna switch semiconductor integrated circuit (ANT_SW). The power amplifiers amplify the RF transmission signal generated by the radio frequency integrated circuit to be supplied to the antenna. The antenna switch semiconductor integrated circuit supplies the RF received signal received by the antenna to the radio frequency integrated circuit, and supplies the output signal of the power amplifiers to the antenna (see FIG. 9).

The integrated circuit is the radio frequency integrated circuit (RF IC) which is described in the section [1] or [2].

Description of the Embodiment

Next, the embodiments will be described in more detail.
<<Configuration of RF IC>>

FIG. 4 is a block diagram showing an RF IC according to an embodiment of the present invention. The RF IC is configured to generate an RF test signal for mismatch calibration for receiver by using a transmission voltage controlled oscillator (Tx-VCO).
<<Reception Unit of RF IC>>

A reception unit of the RF IC shown in FIG. 4 includes a low-noise amplifier 1, a band-pass filter 25, a switch 2, mixers for receiving 3 and 4, low-pass filters 5 and 6, and variable gain amplifiers 7 and 8. Further, the reception unit of the RF IC includes A/D converters 9 and 10, low-pass filters 11 and 12, a mismatch calibration for receiver circuit 13, a gain control circuit 16, a 90-degree phase shifter 17, a divider 18, a voltage-controlled oscillator for receiver (Rx-VCO) 19, and a reception-system digital interface 14.
<<Reception Mode of RF IC>>

In a reception mode of the RF IC, an RF received signal of the WCDMA system received by an antenna ANT of a wireless communication terminal such as a mobile phone is amplified by the low-noise amplifier 1, and then is supplied to one input terminal of each of the mixers for receiving 3 and 4 via the band-pass filter 25 and the switch 2. An oscillation output signal from the Rx-VCO 19 is supplied to the divider 18, and an output signal of the divider 18 is supplied to the 90-degree phase shifter 17. Local signals for receiver from the output of the divider 18 and the output of the 90-degree phase shifter 17 are supplied to the other input terminal of each of the mixers for receiving 3 and 4, so that an I-phase analog baseband signal and a Q-phase analog baseband signal are generated from outputs of the mixers for receiving 3 and 4. The I-phase and Q-phase analog baseband signals are supplied to the A/D converters 9 and 10 via the low-pass filters 5 and 6 and the variable gain amplifiers 7 and 8. I-phase and Q-phase digital baseband signals are generated from outputs of the A/D converters 9 and 10. The low-pass filters 11 and 12, configured by digital filters, coupled to the outputs of the A/D converters 9 and 10 are used for reducing an interfering wave and a quantized noise generated when performing the A/D conversion. Reception mismatch of the I-phase and Q-phase digital baseband signals is calibrated by the mismatch calibration for receiver circuit 13, and then I-phase and Q-phase digital baseband received signals RxDBI and RxDBQ are supplied to a baseband signal processing LSI (not shown) via the reception-system digital interface 14. In the baseband signal processing LSI, demodulation processes, such as phase demodulation and amplitude demodulation for the I-phase and Q-phase digital baseband received signals RxDBI and RxDBQ are performed. The reception-system digital interface 14 is configured by circuits, such as an LVDS (Low Voltage Differential Signalling), for a countermeasure against EMI (Electromagnetic Interference). The frequency band of the I-phase and Q-phase analog baseband signals from the outputs of the mixers for receiving 3 and 4 is a wide band of approximately 2 MHz. Accordingly, the cut-off frequency of the low-pass filters 5 and 6 is set to approximately 2 MHz. For the mismatch calibration for receiver circuit 13, any circuit described in the patent document 3, non-patent document 1 and non-patent document 2.

Figure 13:
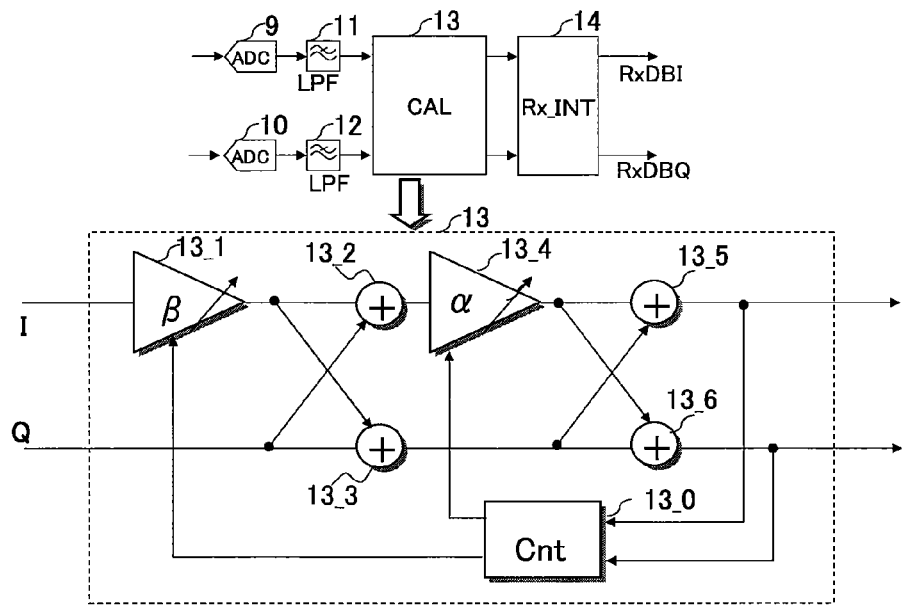
FIG. 13 is a block diagram showing an example of a mismatch calibration for receiver circuit 13 of the RF IC shown in FIG. 4.

FIG. 13 is a block diagram showing an example of the mismatch calibration for receiver circuit 13 of the RF IC shown in FIG. 4. The mismatch calibration for receiver circuit 13 includes a controlling unit 13_0 which calculates a compensation value for calibrating the amplitude mismatch and phase mismatch in accordance with a mismatch compensation algorism. An amplitude compensation unit 13_1 compensates the amplitude of a signal line through which an I-phase signal is mainly transmitted in accordance with the amplitude compensation value from the controlling unit 13_0. A phase compensation unit 13_4 compensates the phase of a signal line through which an I-phase signal is mainly transmitted in accordance with the phase compensation value from the controlling unit 13_0. On signal routes of the signal line through which the I-phase signal is mainly transmitted and the signal line through which the I-phase signal is mainly transmitted, there are arranged adders 13_2, 13_3, 13_5, and 13_6.

Figure 14:
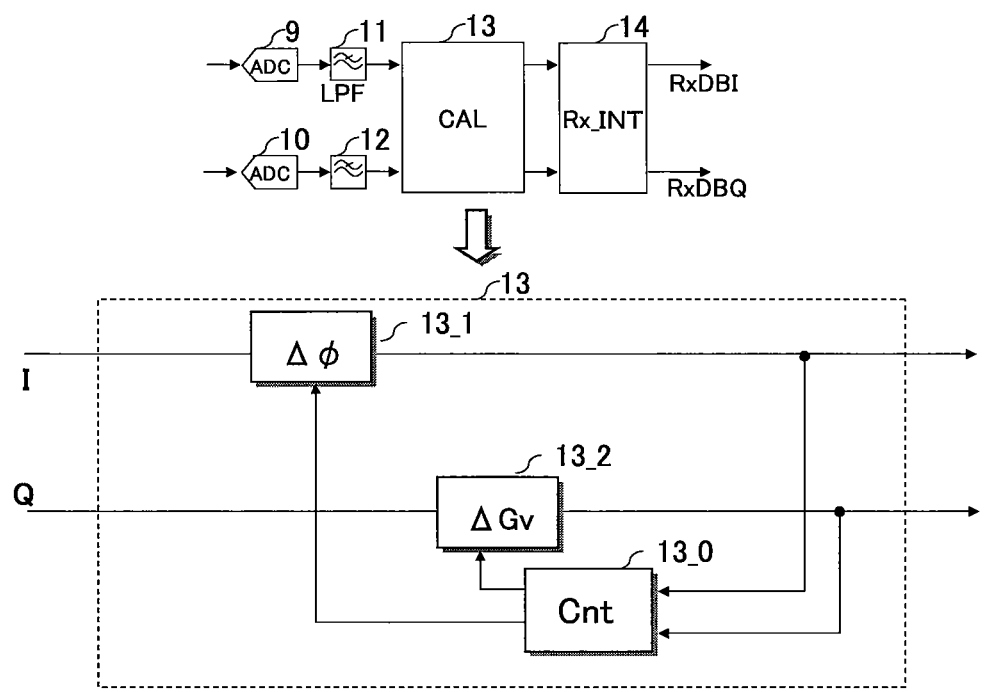
FIG. 14 is a block diagram showing another example of the mismatch calibration for receiver circuit 13 of the RF IC shown in FIG. 4.

FIG. 14 is a block diagram showing another example of the mismatch calibration for receiver circuit 13 of the RF IC shown in FIG. 4. The mismatch calibration for receiver circuit 13 includes a controlling unit 13_0 which calculates a compensation value for calibrating the amplitude mismatch and phase mismatch in accordance with a mismatch compensation algorism. A phase compensation unit 13_1 compensates the phase of a signal line through which an I-phase signal is transmitted in accordance with the phase compensation value from the controlling unit 13_0. A gain compensation unit 13_2 compensates the phase of a signal line through which a Q-phase signal is transmitted in accordance with a gain compensation value from the controlling unit 13_0.
<<Transmission Unit of RF IC>>

A transmission unit of the RF IC shown in FIG. 4 includes a transmission-system digital interface 37, low-pass filters 35 and 36, D/A converters 33 and 34, variable gain amplifiers 31 and 32, a 90-degree phase shifter 30, transmission mixers 28 and 29, an adder 27, a variable gain amplifier 26, and a gain control circuit 38. The transmission unit of the RF IC further includes a transmission voltage controlled oscillator (Tx-VCO) 22 and a divider 21.
<<Transmission Mode of RF IC>>

At the time of transmission, I-phase and Q-phase digital baseband transmission signals TxDBI and TxDBQ are supplied from the baseband signal processing LSI to the transmission-system digital interface 37 configured by, for example, an LVDS circuit, for a countermeasure against EMI. The digital baseband transmission signals whose high-frequency noise is removed by the low-pass filters 35 and 36 are converted into analog baseband transmission signals by the D/A converters 33 and 34. The analog baseband transmission signals output from the D/A converters 33 and 34 are amplified by the variable gain amplifiers 31 and 32, and then are supplied to one input terminal of each of the transmission mixers 28 and 29. An oscillation output signal from the transmission voltage controlled oscillator (Tx-VCO) 22 is supplied to the divider 21, and an output signal of the divider 21 is supplied to the 90-degree phase shifter 30. Transmission local signals from the output of the divider 21 and the output of the 90-degree phase shifter 30 are supplied to the other input terminal of each of the transmission mixers 28 and 29, so that an I-phase RF transmission signal and a Q-phase RF transmission signal are generated from outputs of the transmission mixers 28 and 29. The I-phase RF transmission signal and the Q-phase RF transmission signal are vector-synthesized by the adder 27, so that the RF transmission signal output from the adder 27 is amplified by the variable gain amplifier 26, and an RF power amplifier located outside the RF IC, and then is supplied to the antenna ANT of the wireless communication terminal, such as a mobile phone.

<<Digital Interface of RF IC>>

The reception-system digital interface 14 and the transmission-system digital interface 37 are operated by a digital interface reference signal that is generated by a digital interface voltage controlled oscillator (INT-VCO) 23 and a divider 24. The frequency of an oscillation output of the digital interface voltage controlled oscillator (INT-VCO) 23 is 1248 MHz, and the number of frequency divisions of the divider 24 is 4, so that the frequency of the digital interface reference signal output from the divider 24 is 312 MHz. Accordingly, the reception-system digital interface 14 and the transmission-system digital interface 37 transmit and receive the digital baseband transmission/received signals, each having a transferring rate of 156 Mbps, to/from the baseband signal processing LSI in accordance with the digital interface reference signal.

<<RF Test Signal Generating Unit of RF IC (Combination of Tx VCO and Digital Interface VCO)>>

An RF test signal generating unit of the RF IC shown in FIG. 4 includes a test signal generating mixer 20. A divided output signal from the divider 21 coupled to the Tx VCO 22 and a divided output signal from the divider 24 coupled to the digital interface INT-VCO 23 are supplied to one input terminal and the other input terminal of the test signal generating mixer 20. An RF test signal output from the test signal generating mixer 20 is supplied to one input terminal of each of the mixers for receiving 3 and 4 via the switch in the calibration mode of the RF IC.

<<Calibration Mode of RF IC>>

Next, "calibration mode" will be described. The "calibration mode" is an operation mode in which the RF IC shown in FIG. 4 calibrates reception mismatch. The "calibration mode" is executed immediately after power-on of the RF IC, or before "transmission/reception mode" immediately after starting from an idle state of the RF IC.

The mismatch calibration for receiver circuit 13 calibrates mismatch of the received orthogonal-demodulated signals from the demodulated signal processing circuits 5, 6, 7, 8, 9, 10, 11 and 12 in accordance with outputs of the mixers for receiving 3 and 4 to which the RF test signal is supplied in the calibration mode of the RF IC. Accordingly, the mismatch calibration for receiver circuit 13 calibrates mismatch of the received orthogonal-demodulated signals from the demodulated signal processing circuits 5, 6, 7, 8, 9, 10, 11 and 12 in accordance with the RF received signal of the antenna ANT in the reception mode of the RF IC. Calibration information generated by the mismatch calibration for receiver circuit 13 in the "calibration mode" immediately after power-on of the RF IC, or immediately after starting from an idle state of the RF IC can be stored into an internal RAM of the RF IC. Calibration information generated by the mismatch calibration for receiver circuit 13 in the "calibration mode" at the time of shipment of the RF IC from a manufacturing factory or at the time of shipment of a mobile phone having the RF IC mounted from a manufacturing factory can be stored into a nonvolatile memory, such as a flash memory of a mobile phone. Into the nonvolatile memory, such as a flash memory, various application programs for an application processor can be also stored.

As described above, for the mismatch calibration for receiver circuit 13, there can be used any circuit described in the patent document 3, non-patent document 1 and non-patent document 2. The mismatch calibration for receiver circuit 13 detects mismatch of the demodulated test signals that pass through the circuits with the reference numerals 3, 4, 5, 6, 7, 8, 9 and 10 in the "calibration mode", and calculates a mismatch compensation value for the I-phase and Q-phase baseband received signals in the "reception mode" by repeat operation. In order to generate the demodulated test signals, each having a frequency band near that of the analog baseband received signal, as outputs of the mixers for receiving 3 and 4, it is necessary to supply the RF test signal for mismatch calibration for receiver to the mixers for receiving 3 and 4. It is possible to use the received signal from the base station as the RF test signal for mismatch calibration for receiver. However, the received signal from the base station is not constant in level, and is frequency-modulated, so that it is difficult to calculate a compensation value with high accuracy in a short period of time.

On the assumption that the frequency of the RF test signal for mismatch calibration for receiver is represented as $f_{test}$, the frequency of the RF reception local signal Rx-LO obtained by division of the Rx-VCO 19 is represented as $f_{Rx\text{-}LO}$, and the frequency band of the analog baseband received signal output from the mixers for receiving 3 and 4 is represented as $f_{BW}$, the relation of the following formula needs to be satisfied in the RF IC of FIG. 4.

$$|f_{Rx\text{-}LO} - f_{test}| \leq f_{BW} \qquad \text{(Formula 1)}$$

Further, the RF IC shown in FIG. 4 performs a transmission/reception operation so as to cover the transmission/receiving bands of Band1, Band2, and Band5 in the WCDMA system of the UMTS standard shown in FIG. 3. Specifically, in the reception mode of Band1 and Band2 in the WCDMA system, the number of frequency divisions of the divider 18 coupled to the Rx-VCO 19 is set to 2. Further, in the reception mode of Band5 in the WCDMA system, the number of frequency divisions of the divider 18 coupled to the Rx-VCO 19 is set to 4. In addition, in the transmission mode of Band1 and Band2 in the WCDMA system, the number of frequency divisions of the divider 21 coupled to the Tx VCO 22 is set to 2. Further, in the transmission mode of Band5 in the WCDMA system, the number of frequency divisions of the divider 21 coupled to the Tx VCO 22 is set to 4.

Accordingly, the Rx-VCO 19 covers the oscillation frequencies from 3476 MHz that is four times the minimum reception frequency 869 MHz of Band5 in the WCDMA system to 4340 MHz that is twice the maximum reception frequency 2170 MHz of Band1 in the WCDMA system.

In addition, the Tx VCO 22 covers the oscillation frequencies from 3296 MHz that is four times the minimum transmission frequency 824 MHz of Band5 in the WCDMA system to 3960 MHz that is twice the maximum transmission frequency 1980 MHz of Band1 in the WCDMA system.

The Tx VCO 22 oscillates at a relatively low oscillation frequency of 3656 MHz that corresponds to transmission between Band2 and Band5 in the WCDMA system in the "calibration mode" of Band1 that has the highest frequency in the WCDMA system for which test conditions are the severest. Accordingly, a division signal at 1828 MHz is supplied to one input terminal of the test signal generating mixer 20 from the divider 21 for which the number of frequency divisions is set to 2. A digital reference signal at 312 MHz is supplied to the other input terminal of the test signal generating mixer 20 from the divider 24 coupled to the digital interface INT-VCO 23. Accordingly, the RF test signal for mismatch calibration for receiver at 2140 MHz and an image signal at 1516 MHz are generated from the output of the test signal generating mixer 20, and are supplied to one input terminal of each of the mixers for receiving 3 and 4 via the switch 2.

On the other hand, the Rx-VCO 19 oscillates at an oscillation frequency of 4278 MHz that corresponds to the reception frequency band of Band1 in the WCDMA system. Accordingly, a division output signal at 2139 MHz is generated from the output of the divider 18 for which the number of frequency divisions is set to 2. Calibration local signals at 2139 MHz are supplied to the other input terminal of each of the mixers for receiving 3 and 4 from the output of the divider 18 and the output of the 90-degree phase shifter 17.

Accordingly, by the mixers for receiving 3 and 4, the RF test signal for mismatch calibration for receiver at 2140 MHz and the calibration local signal at 2139 MHz are mixed and the image signal at 1516 MHz and the calibration local signal at 2139 MHz are mixed. In the former mixing, a signal at 1 MHz (=2140 MHz−2139 MHz) and a signal at 4279 MHz (=2140 MHz+2139 MHz) are generated. In the latter mixing, a signal at 3655 MHz (=1516 MHz+2139 MHz) and a signal at −623 MHz (=1516 MHz−2139 MHz) are generated.

The frequency band $f_{BW}$ of the baseband received signal in the WCDMA system is set to approximately 2 MHz (more precisely, approximately 1.92 MHz). Thus, the signal-pass frequency band for the low-pass filters 5 and 6 coupled to the outputs of the mixers for receiving 3 and 4 is also set to approximately 2 MHz. Only the first signal at 1 MHz (=2140 MHz−2139 MHz) among the signals with four kinds of frequencies that are generated by mixing at the mixers for receiving 3 and 4 is supplied, as a demodulated test signal, to reception circuits subsequent to the variable gain amplifiers 7 and 8, and the signals with the other three frequencies are sufficiently attenuated through the low-pass filters 5 and 6.

Since the frequency $f_{test}$ of the RF test signal for mismatch calibration for receiver is 2140 MHz, the frequency $f_{Rx-LO}$ of the RF reception local signal Rx-LO is 2139 MHz, and the frequency band $f_{BW}$ of the analog baseband received signal output from the mixers for receiving 3 and 4 is 2 MHz, the relation of the formula 1 is satisfied.

Further, it is necessary to set the frequency of the output signals of the dividers 21 and 24 so that the other image signals at −1516 MHz (=312 MHz−1828 MHz) that are formed by the test signal generating mixer 20 are attenuated through the low-pass filters 5 and 6. On the assumption that the division signal frequency of the digital interface divider 24 is represented as $f_{Dig}$ and the frequency band of the analog baseband received signal output from the mixers for receiving 3 and 4 is represented as $f_{BW}$, the relation of the following formula needs to be satisfied in the RF IC of FIG. 4.

$$f_{Dig} \geq 2f_{BW} \qquad \text{(Formula 2)}$$

Since the division signal frequency $f_{Dig}$ of the digital interface divider 24 is 312 MHz and the frequency band $f_{BW}$ of the analog baseband received signal output from the mixers for receiving 3 and 4 is 2 MHz, 312 MHz≧4 MHz is satisfied. Accordingly, the relation of the above formula 2 is satisfied.

Although the mismatch calibration for receiver of Band1 in the WCDMA system has been described above, it is possible to perform the mismatch calibration for receiver of Band2 and Band5 in the WCDMA system by the same method.

When performing the mismatch calibration for receiver of Band2 in the WCDMA system, a RF test signal for mismatch calibration for receiver at 1960 MHz that is intermediate between 1930 MHz of the minimum reception frequency and 1990 MHz of the maximum reception frequency of Band2 in the WCDMA system is generated from the output of the test signal generating mixer 20. An oscillation signal at 3296 MHz is allowed to generate from the Tx VCO 22, and a division output at 1648 MHz from the divider 21 and a division output at 312 MHz from the divider 24 are supplied to the test signal generating mixer 20. The RF test signal for mismatch calibration for receiver at 1960 MHz is generated from the test signal generating mixer 20. Calibration local signals at 1959 MHz are supplied to the other input terminal of each of the mixers for receiving 3 and 4 from the output of the divider 18 and the output of the 90-degree phase shifter 17. When the Rx-VCO 19 is allowed to oscillate at 3916 MHz within the reception frequency band of Band2, the calibration local signal at 1959 MHz is generated from the divider 18 for which the number of frequency divisions is set to 2.

When performing the mismatch calibration for receiver of Band5 in the WCDMA system, an RF test signal for mismatch calibration for receiver at 881 MHz that is intermediate between 869 MHz of the minimum reception frequency and 894 MHz of the maximum reception frequency of Band5 in the WCDMA system is generated from the output of the test signal generating mixer 20. An oscillation signal at 3368 MHz is allowed to generate from the Tx VCO 22, and a division output at 842 MHz from the divider 21 for which the number of frequency divisions is set to 4 and a division output at 39 MHz from the divider 24 (32 frequency divisions) are supplied to the test signal generating mixer 20. The RF test signal for mismatch calibration for receiver at 881 MHz is generated from the test signal generating mixer 20. Calibration local signals at 880 MHz are supplied to the other input terminal of each of the mixers for receiving 3 and 4 from the output of the divider 18 and the output of the 90-degree phase shifter 17. When the Rx-VCO 19 is allowed to oscillate at 3520 MHz within the reception frequency band of Band2, the calibration local signal at 880 MHz is generated from the divider 18 for which the number of frequency divisions is set to 4.

RF IC According to Another Embodiment

<<Generation of RF Test Signal Based on Combination of Tx VCO and System Reference Voltage Controlled Oscillator DCX-VCO>>

Figure 5:
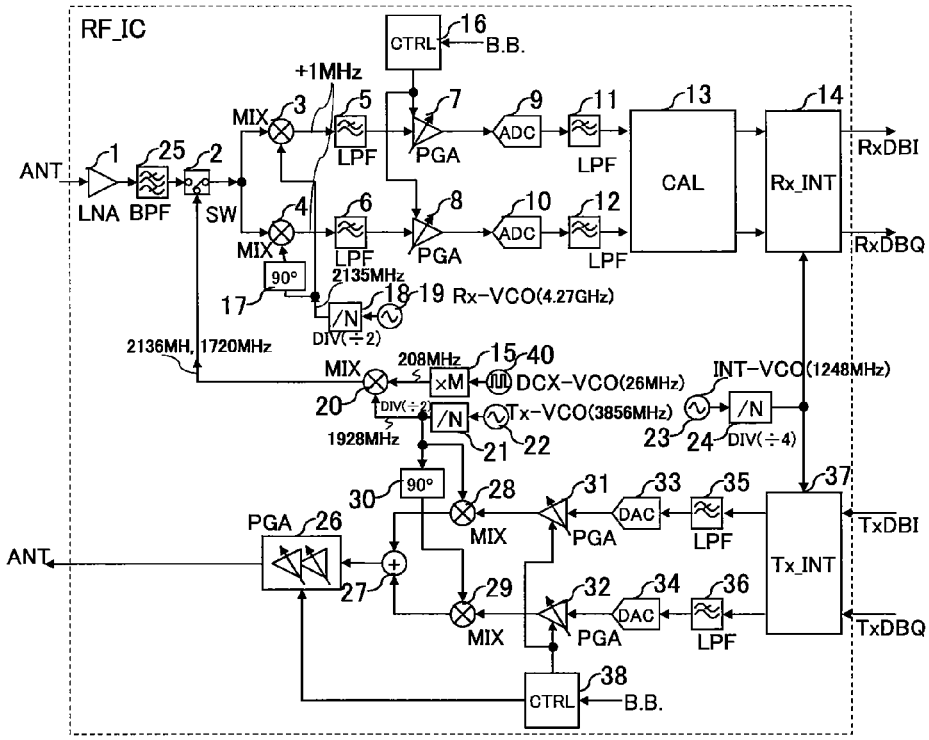
FIG. 5 is a block diagram showing an RF IC according to another embodiment of the present invention.

FIG. 5 is a block diagram showing an RF IC according to another embodiment of the present invention. The RF IC is also configured to generate the RF test signal for mismatch calibration for receiver by using the transmission voltage controlled oscillator (Tx-VCO).

The RF IC shown in FIG. 5 is different from that shown in FIG. 4 in the configuration of the RF test signal generating unit that forms the RF test signal for mismatch calibration for receiver, and the other configurations are the same. As similar to FIG. 4, the division output signal from the divider 21 coupled to the Tx VCO 22 is supplied to one input terminal of the test signal generating mixer 20 of the RF test signal generating unit of the RF IC shown in FIG. 5. However, an output signal from a frequency multiplier 15 coupled to the system reference voltage controlled oscillator (DCX-VCO) 40 is supplied to the other input terminal of the test signal generating mixer 20. The system reference voltage controlled oscillator (DCX-VCO) 40 is present in a PLL frequency synthesizer for a transmission/reception operation of the RF IC and generates a system reference signal used when generating the RF reception local signal and the RF transmission local signal. The system reference voltage controlled oscillator (DCX-VCO) 40 includes a crystal oscillator for determining an oscillation frequency. Further, an AFC (Automatic Frequency Control) signal is supplied from the baseband signal processing LSI to the system reference voltage controlled oscillator (DCX-VCO) 40, and thus the system reference voltage controlled oscillator (DCX-VCO) 40 oscillates a system reference signal that is maintained at an extremely-stable frequency of 26 MHz.

Since the Tx VCO 22 oscillates at 3858 MHz that corresponds to Band1 in the WCDMA system, a division signal at 1928 MHz is generated from the divider 21 for which the number of frequency divisions is set to 2, and is supplied to one input terminal of the test signal generating mixer 20. On the other hand, the system reference voltage controlled oscillator (DCX-VCO) 40 oscillates a system reference signal at a stable frequency of 26 MHz as described above. A frequency multiplier coefficient M of the frequency multiplier 15 is set to 8, so that a frequency-multiplied output signal at 208 MHz is generated from the output of the frequency multiplier 15. The frequency multiplier 15 can be configured by, for example, a PLL (Phase Locked Loop) circuit. The PLL circuit is configured by a phase comparator to one input terminal of which a system reference signal at 26 MHz is supplied, a voltage controlled oscillator that is controlled by an output of the phase comparator to oscillate an output at 208 MHz, and a divider for which the number of frequency divisions is set to 8. The divider for which the number of frequency divisions is set to 8 is coupled between the output of the voltage controlled oscillator and the other input terminal of the phase comparator.

The division signal at 1928 MHz from the divider 21 and the multiplied output signal at 208 MHz output from the frequency multiplier 15 are mixed by the test signal generating mixer 20. Accordingly, an RF test signal for mismatch calibration for receiver at 2136 MHz and an image signal at 1720 MHz are generated from the output of the test signal generating mixer 20, and are supplied to one input terminal of each of the mixers for receiving 3 and 4 through the switch 2.

On the other hand, the Rx-VCO 19 oscillates at an oscillation frequency of 4270 MHz that corresponds to the reception frequency band of Band1 in the WCDMA system. Accordingly, a division output signal at 2135 MHz is generated from the output of the divider 18 for which the number of frequency divisions is set to 2. Calibration local signals at 2135 MHz are supplied to the other input terminal of each of the mixers for receiving 3 and 4 from the output of the divider 18 and the output of the 90-degree phase shifter 17.

Accordingly, by the mixers for receiving 3 and 4, the RF test signal for mismatch calibration for receiver at 2136 MHz and the calibration local signal at 2135 MHz are mixed and the image signal at 1720 MHz and the calibration local signal at 2135 MHz are mixed. In the former mixing, a signal at 1 MHz (=2136 MHz−2135 MHz) and a signal at 4271 MHz (=2136 MHz+2135 MHz) are generated. In the latter mixing, a signal at 3855 MHz (=1720 MHz+2135 MHz) and a signal at −415 MHz (=1720 MHz−2135 MHz) are generated.

The frequency band $f_{BW}$ of the baseband received signal in the WCDMA system is set to approximately 2 MHz (more precisely, approximately 1.92 MHz). Thus, the signal-pass frequency band for the low-pass filters 5 and 6 coupled to the outputs of the mixers for receiving 3 and 4 is also set to approximately 2 MHz. Only the first signal at 1 MHz (=2136 MHz−2135 MHz) among the signals with four kinds of frequencies that are generated by mixing at the mixers for receiving 3 and 4 is supplied, as a demodulated test signal, to reception circuits subsequent to the variable gain amplifiers 7 and 8, and the signals with the other three frequencies are sufficiently attenuated through the low-pass filters 5 and 6.

Since the frequency $f_{test}$ of the RF test signal for mismatch calibration for receiver is 2136 MHz, the frequency $f_{Rx\text{-}LO}$ of the RF reception local signal Rx-LO is 2135 MHz, and the frequency band $f_{BW}$ of the analog baseband received signal output from the mixers for receiving 3 and 4 is 2 MHz, the relation of the formula 1 is satisfied.

Further, it is necessary to set the frequency of the output signals of the dividers 21 and 15 so that the other image signals at −1720 MHz (=208 MHz−1928 MHz) that are formed by the test signal generating mixer 20 are attenuated through the low-pass filters 5 and 6. On the assumption that the frequency of the output signal from the frequency multiplier 15 is represented as $f_{SYS}$ and the frequency band of the analog baseband received signal output from the mixers for receiving 3 and 4 is represented as $f_{BW}$, the relation of the following formula needs to be satisfied in the RF IC of FIG. 4.

$$f_{SYS} \geq 2f_{BW} \quad \text{(Formula 3)}$$

Since the output signal frequency $f_{SYS}$ of the frequency multiplier 15 is 208 MHz and the frequency band $f_{BW}$ of the analog baseband received signal output from the mixers for receiving 3 and 4 is 2 MHz, 208 MHz≧4 MHz is satisfied. Accordingly, the relation of the above formula 3 is satisfied.

Although the mismatch calibration for receiver of Band1 in the WCDMA system has been described above, it is possible to perform the mismatch calibration for receiver of Band2 and Band5 in the WCDMA system in the RF IC of FIG. 5 by the same method as that performed in the RF IC of FIG. 4.

<<Generation of RF Test Signal Based on Combination of Tx VCO and Fractional Divider>>

Figure 6:
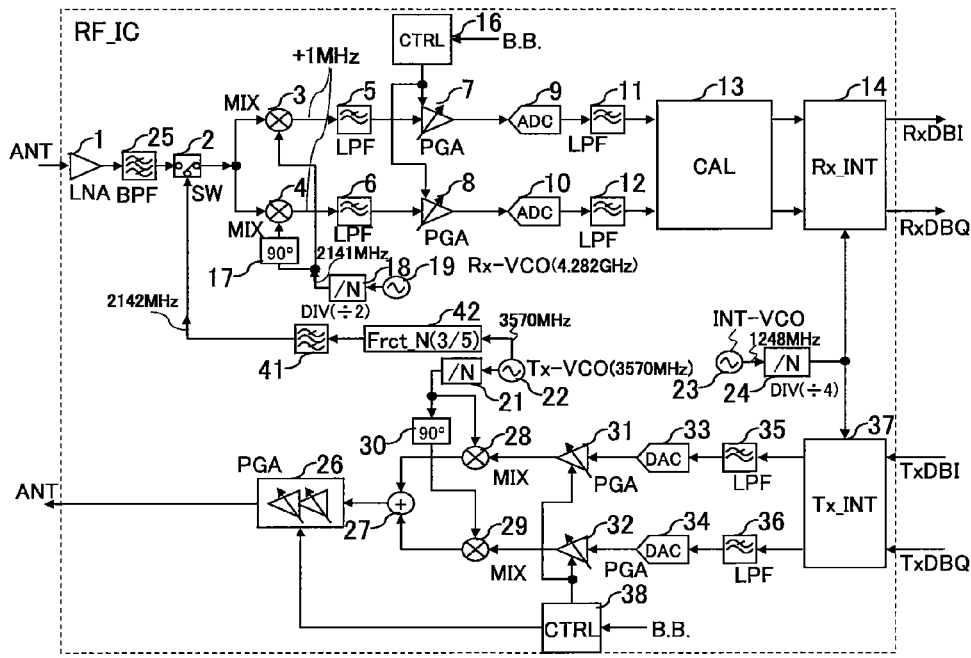
FIG. 6 is a block diagram showing an RF IC according to still another embodiment of the present invention.

FIG. 6 is a block diagram showing an RF IC according to still another embodiment of the present invention. The RF IC is also configured to generate the RF test signal for mismatch calibration for receiver by using the transmission voltage controlled oscillator (Tx-VCO).

The RF IC shown in FIG. 6 is different from that shown in FIG. 4 in the configuration of the RF test signal generating unit that forms the RF test signal for mismatch calibration for receiver, and the other configurations are the same. The RF test signal generating unit of the RF IC shown in FIG. 6 includes the fractional divider 42 coupled to the Tx VCO 22. As well known in the art, the fractional divider can realize a frequency synthesizer with high frequency-resolution because the number N of frequency divisions includes not only an integral number, but also a fraction (decimal number).

The Tx VCO 22 oscillates at a relatively low frequency of 3570 MHz that corresponds to the transmission frequency band between Band2 and Band5 in the WCDMA system. A division signal at 2142 MHz (=3570 MHz×⅗=3570 MHz× 0.6) is generated from the fractional divider 42 for which the number N of frequency divisions is set to a fraction (⅗), and is supplied to a band-pass filter 41, so that the operational noise of the fractional divider 42 is removed. An RF test signal for mismatch calibration for receiver at 2142 MHz is generated from the output of the band-pass filter 41, and is supplied to one input terminal of each of the mixers for receiving 3 and 4 via the switch 2. As well known in the art, the fractional divider 42 in which the number N of frequency divisions includes not only an integral number, but also a fraction (decimal number) can be configured by a ΣΔ modulator and a variable divider (counter). Numerator information and denominator information are input to the ΣΔ modulator. The ΣΔ modulator generates an overflow/one-bit output signal with frequency in accordance with a fraction (numerator/denominator) in response to an input clock signal. The variable divider (counter) is controlled by the level "1" or "0" of the overflow/one-bit output signal, and a division output signal at 2142 MHz can be generated from the input signal at 3570 MHz.

On the other hand, the Rx-VCO 19 oscillates at an oscillation frequency of 4282 MHz that corresponds to the reception frequency band of Band1 in the WCDMA system. Accordingly, a division output signal at 2141 MHz is generated from the output of the divider 18 for which the number of frequency divisions is set to 2. Calibration local signals at 2141 MHz are supplied to the other input terminal of each of the mixers for receiving 3 and 4 from the output of the divider 18 and the output of the 90-degree phase shifter 17.

Accordingly, by the mixers for receiving 3 and 4, the RF test signal for mismatch calibration for receiver at 2142 MHz and the calibration local signal at 2141 MHz are mixed. In the mixing, a signal at 1 MHz (=2142 MHz−2141 MHz) and a signal at 4283 MHz (=2142 MHz+2141 MHz) are generated.

The frequency band $f_{BW}$ of the baseband received signal in the WCDMA system is set to approximately 2 MHz (more precisely, approximately 1.92 MHz). Thus, the signal-pass frequency band for the low-pass filters 5 and 6 coupled to the outputs of the mixers for receiving 3 and 4 is also set to approximately 2 MHz. Only the first signal at 1 MHz (=2142 MHz−2141 MHz) among the signals with two kinds of frequencies that are generated by mixing at the mixers for receiving 3 and 4 is supplied, as a demodulated test signal, to reception circuits subsequent to the variable gain amplifiers 7 and 8, and the signal with the other frequency is sufficiently attenuated through the low-pass filters 5 and 6.

Since the frequency $f_{test}$ of the RF test signal for mismatch calibration for receiver is 2142 MHz, the frequency $f_{Rx-LO}$ of the RF reception local signal Rx-LO is 2141 MHz, and the frequency band $f_{BW}$ of the analog baseband received signal output from the mixers for receiving 3 and 4 is 2 MHz, the relation of the formula 1 is satisfied.

Although the mismatch calibration for receiver of Band1 in the WCDMA system has been described above, it is possible to perform the mismatch calibration for receiver of Band2 and Band5 in the WCDMA system in the RF IC of FIG. 6 by the same methods as those performed in the RF IC of FIGS. 4 and 5.

<<Generation of RF Test Signal Based on Combination of Tx VCO and Controlling Circuit>>

Figure 7:
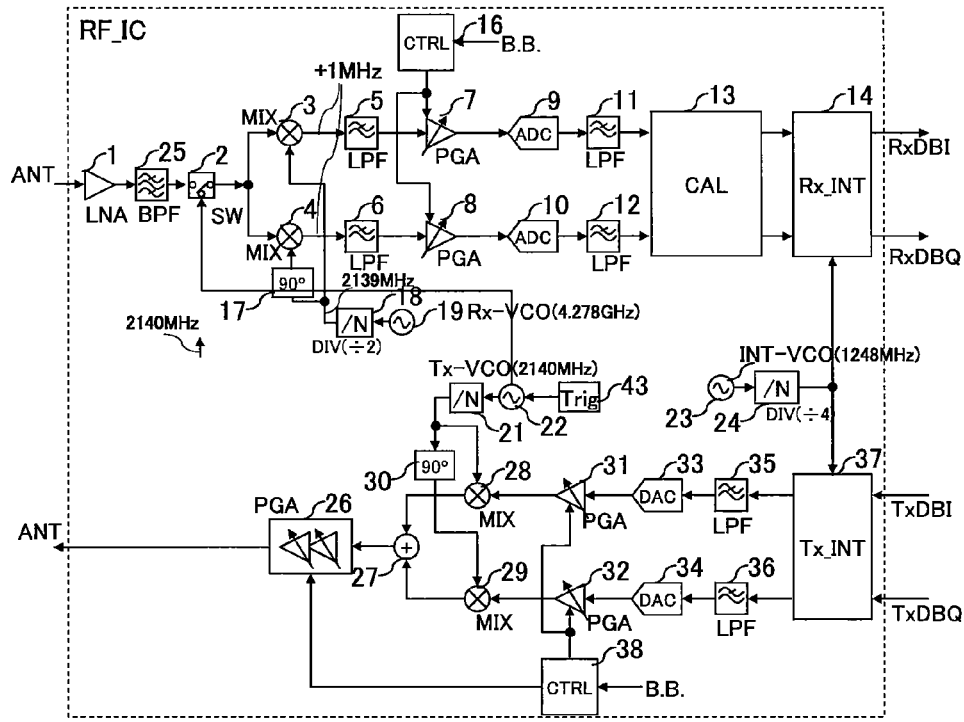
FIG. 7 is a block diagram showing an RF IC according to still another embodiment of the present invention.

FIG. 7 is a block diagram showing an RF IC according to still another embodiment of the present invention. The RF IC is also configured to generate the RF test signal for mismatch calibration for receiver by using the transmission voltage controlled oscillator (Tx-VCO).

The RF IC shown in FIG. 7 is different from that shown in FIG. 4 in the configuration of the RF test signal generating unit that forms the RF test signal for mismatch calibration for receiver, and the other configurations are the same. The RF test signal generating unit of the RF IC shown in FIG. 7 includes a trigger controlling circuit 43 coupled to the Tx VCO 22.

The trigger controlling circuit 43 supplies a high-level calibration mode signal to the Tx VCO 22 in the "calibration mode" immediately after power-on of the RF IC, or immediately after starting from an idle state of the RF IC.

As described above, in a normal reception or transmission mode, the Tx VCO 22 covers the oscillation frequencies from 3296 MHz that is four times the minimum transmission frequency 824 MHz of Band5 in the WCDMA system to 3960 MHz that is twice the maximum transmission frequency 1980 MHz of Band1 in the WCDMA system. Further, in a normal reception or transmission mode, the Tx VCO 22 is controlled by the PLL frequency synthesizer including the system reference voltage controlled oscillator (DCX-VCO) 40 as shown in FIG. 5, so that the Tx VCO 22 covers the oscillation frequencies from 3296 MHz to 3960 MHz.

However, when a high-level calibration mode signal is supplied to the Tx VCO 22 from the trigger controlling circuit 43 in the "calibration mode", the oscillation frequency of the Tx VCO 22 is changed to an extremely low oscillation frequency of 2140 MHz as the RF test signal for mismatch calibration for receiver. This is because the capacitance value of a variable capacitive element such as an MOS varactor, inside the Tx VCO 22, that determines the oscillation frequency of the Tx VCO 22 is largely increased by the high-level calibration mode signal. Thus, the oscillation frequency of the Tx VCO 22 becomes an extremely low oscillation frequency of 2140 MHz as the RF test signal for mismatch calibration for receiver in the "calibration mode".

On the other hand, the Rx-VCO 19 oscillates at an oscillation frequency of 4278 MHz that corresponds to the reception frequency band of Band1 in the WCDMA system. Accordingly, a division output signal at 2139 MHz is generated from the output of the divider 18 for which the number of frequency divisions is set to 2. Calibration local signals at 2139 MHz are supplied to the other input terminal of each of the mixers for receiving 3 and 4 from the output of the divider 18 and the output of the 90-degree phase shifter 17.

Accordingly, by the mixers for receiving 3 and 4, the RF test signal for mismatch calibration for receiver at 2140 MHz and the calibration local signal at 2139 MHz are mixed. In the mixing, a signal at 1 MHz (=2140 MHz−2139 MHz) and a signal at 4279 MHz (=2140 MHz+2139 MHz) are generated.

The frequency band $f_{BW}$ of the baseband received signal in the WCDMA system is set to approximately 2 MHz (more precisely, approximately 1.92 MHz). Thus, the signal-pass frequency band for the low-pass filters 5 and 6 coupled to the outputs of the mixers for receiving 3 and 4 is also set to approximately 2 MHz. Only the first signal at 1 MHz (=2140 MHz−2139 MHz) among the signals with two kinds of frequencies that are generated by mixing at the mixers for receiving 3 and 4 is supplied, as a demodulated test signal, to reception circuits subsequent to the variable gain amplifiers 7 and 8, and the signal with the other frequency is sufficiently attenuated through the low-pass filters 5 and 6.

Since the frequency $f_{test}$ of the RF test signal for mismatch calibration for receiver is 2140 MHz, the frequency $f_{Rx-LO}$ of the RF reception local signal Rx-LO is 2139 MHz, and the frequency band $f_{BW}$ of the analog baseband received signal output from the mixers for receiving 3 and 4 is 2 MHz, the relation of the formula 1 is satisfied.

Although the mismatch calibration for receiver of Band1 in the WCDMA system has been described above, it is possible to perform the mismatch calibration for receiver of Band2 and Band5 in the WCDMA system in the RF IC of FIG. 7 by the same methods as those performed in the RF IC of FIGS. 4, 5 and 6.

<<Generation of RF Test Signal Corresponding to WCDMA System and the Other Communication Systems>>

Figure 8:
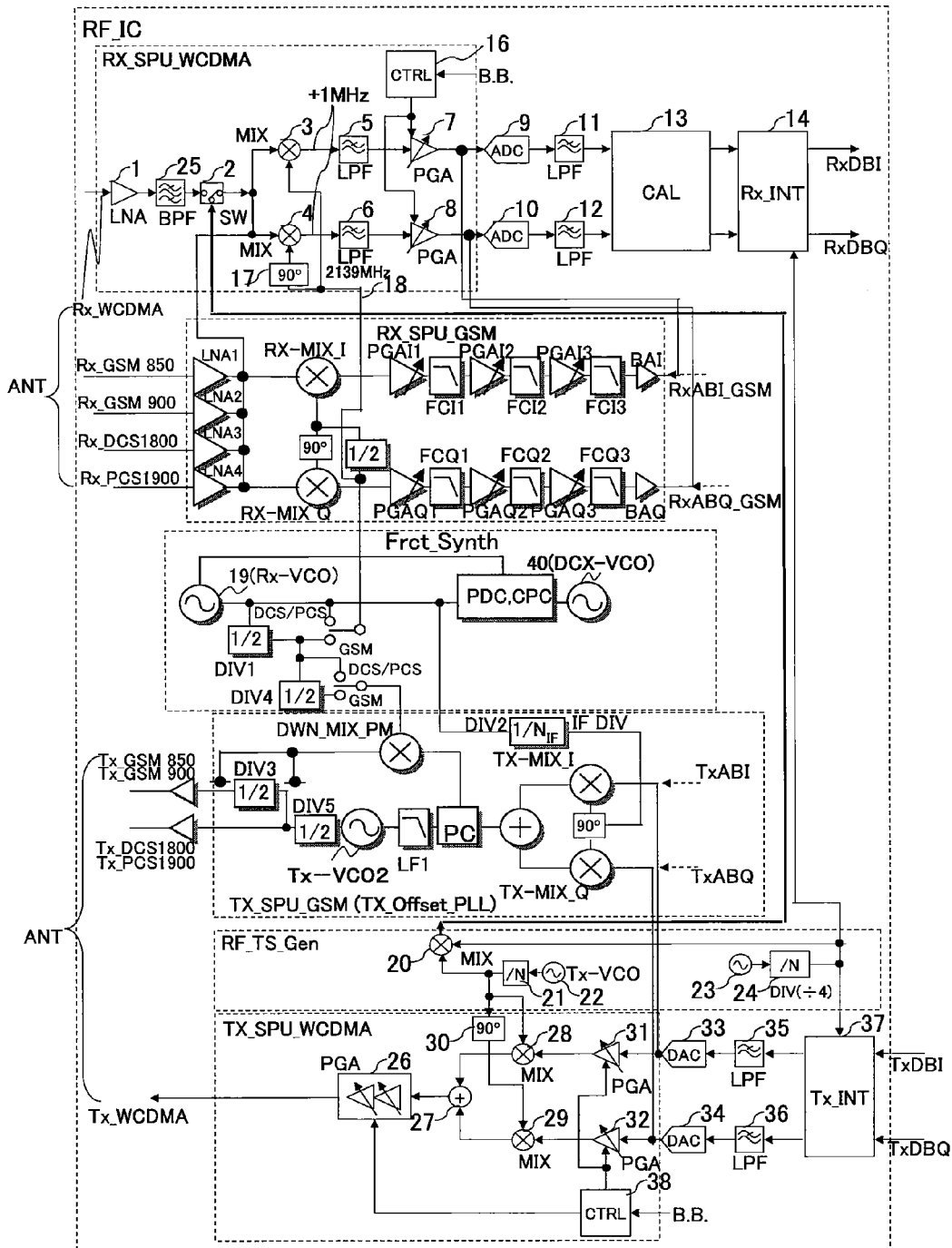
FIG. 8 is a block diagram showing an RF IC according to still another embodiment of the present invention.

FIG. 8 is a block diagram showing an RF IC according to still another embodiment of the present invention. The RF IC can perform transmission/reception of Band1, Band2 and Band5 in the WCDMA system, and also can perform transmission/reception of GSM850, GSM900, DCS1800 and PCS1900 systems.

Figure 10:
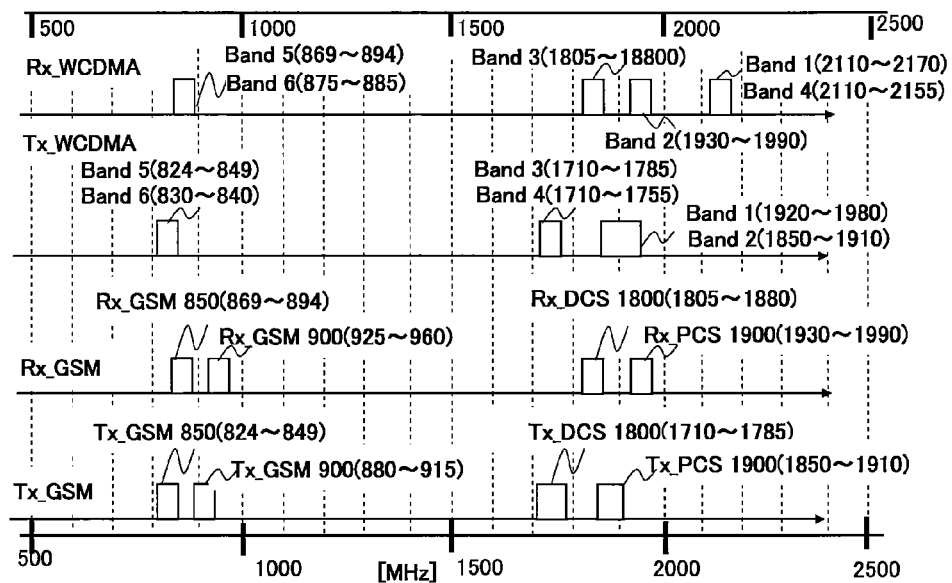
FIG. 10 is a diagram showing the transmission/receiving bands of various communication systems.

FIG. 10 is a diagram showing transmission/receiving bands of various communication systems. An upper portion of FIG. 10 indicates transmission/receiving bands in the WCDMA system. As described above, in the case of Band5 (U.S region) that has the lowest frequency band in the WCDMA system, the frequency band of the RF transmission signal TX of the wireless communication terminal ranges from 824 to 849 MHz, whereas the frequency band of the RF received signal RX of the wireless communication terminal ranges from 869 to 894 MHz. As similar to the above, in the case of Band2 (Europe region) in the WCDMA system, the frequency band of the RF transmission signal TX of the wireless communication terminal ranges from 1850 to 1910 MHz, whereas the frequency band of the RF received signal RX of the wireless communication terminal ranges from 1930 to 1990 MHz. Further, in the case of Band1 (U.S region) that has the highest frequency band in the WCDMA system in the UMTS standard, the frequency band of the RF transmission signal TX of the wireless communication terminal ranges from 1920 to 1980 MHz, whereas the frequency band of the RF received signal RX of the wireless communication terminal ranges from 2110 to 2170 MHz.

Further, there exist communications of the WCDMA system other than the above-described systems. In the case of Band6 (Japan region) that has a lower frequency band in the WCDMA system, the frequency band of the RF transmission signal TX of whereas the frequency band of the RF received signal RX of the wireless communication terminal ranges from 875 to 885 MHz. In the case of Band4 (U.S region) in the WCDMA system, the frequency band of the RF transmission signal TX of the wireless communication terminal ranges from 1710 to 1775 MHz, whereas the frequency band of the RF received signal RX of the wireless communication terminal ranges from 2110 to 2115 MHz. In the case of Band3 (Europe and other regions) in the WCDMA system, the frequency band of the RF transmission signal TX of the wireless communication terminal ranges from 1710 to 1785 MHz, whereas the frequency band of the RF received signal RX of the wireless communication terminal ranges from 1805 to 1880 MHz.

The transmission/receiving bands of communication systems other than the WCDMA system are shown at a lower portion of FIG. 10. In the case of GSM850, the frequency band of the RF transmission signal TX of the wireless communication terminal ranges from 824 to 849 MHz, whereas the frequency band of the RF received signal RX of the wireless communication terminal ranges from 869 to 894 MHz. In the case of GSM900, the frequency band of the RF transmission signal TX of the wireless communication terminal ranges from 880 to 915 MHz, whereas the frequency band of the RF received signal RX of the wireless communication terminal ranges from 925 to 960 MHz. In the case of DCS1800, the frequency band of the RF transmission signal TX of the wireless communication terminal ranges from 1710 to 1785 MHz, whereas the frequency band of the RF received signal RX of the wireless communication terminal ranges from 1805 to 1880 MHz. In the case of PCS1900, the frequency band of the RF transmission signal TX of the wireless communication terminal ranges from 1850 to 1910 MHz, whereas the frequency band of the RF received signal RX of the wireless communication terminal ranges from 1930 to 1990 MHz. As described above, an FDD system in which the receiving band frequency RX is higher than the transmission band frequency TX is employed in any frequency band.

A circuit RX_SPU_WCDMA at an upper portion of the RF IC shown in FIG. 8 is a circuit for reception of Band1, Band2 and Band5 in the WCDMA system, and corresponds to a circuit at an upper portion of the RF IC shown in FIG. 4. A circuit TX_SPU_WCDMA at a lower portion of the RF IC shown in FIG. 8 is a circuit for transmission of Band1, Band2 and Band5 in the WCDMA system, and corresponds to a circuit at a lower portion of the RF IC shown in FIG. 4. A circuit RX_SPU_GSM at an upper middle portion of the RF IC shown in FIG. 8 is a circuit for reception of GSM850, GSM900, DCS1800 and PCS1900. A circuit TX_SPU_GSM at a lower middle portion of the RF IC shown in FIG. 8 is a circuit for transmission of GSM850, GSM900, DCS1800 and PCS1900.

A circuit Frct_Synth in the middle of the RF IC shown in FIG. 8 is a fractional synthesizer that forms a transmission/reception local signal of the RF IC. The fractional synthesizer Frct_Synth includes the system reference voltage controlled oscillator (DCX-VCO) 40 and the voltage-controlled oscillator for receiver (Rx-VCO) 19.

An RF test signal generating unit RF_TS_Gen is arranged between the fractional synthesizer Frct_Synth and a transmission circuit T_SPU_WCDMA of the WCDMA system. The RF test signal generating unit RF_TS_Gen in FIG. 8 includes, as similar to the RF test signal generating unit in FIG. 4, the test signal generating mixer 20, the Tx VCO 22, the divider 21, the digital interface INT-VCO 23, and the divider 24.

In the calibration mode for communications of the WCDMA system in the RF IC, the RF test signal output from the test signal generating mixer 20 is supplied to one input terminal of each of the mixers for receiving 3 and 4 of the WCDMA-system reception circuit RX_SPU_WCDMA via the switch 2. The calibration mode for communications of the WCDMA system is the same as that of the RF IC in FIG. 4. Therefore, the explanation thereof will be omitted.

In the calibration mode for communications of a communication system other than the WCDMA system in the RF IC, the RF test signal output from the test signal generating mixer 20 is supplied to one input terminal of each of the mixers for receiving RX_MIX_I and RX_MIX_Q of an other-system reception circuit RX_SPU_GSM via the switch 2.

In the calibration mode for reception of PCS1900, an RF test signal for mismatch calibration for receiver at 1960 MHz is supplied to one input terminal of each of the mixers for receiving RX_MIX_I and RX_MIX_Q from the output of the test signal generating mixer 20 via the switch 2. At this time, a reception local signal at 1959.9 MHz is supplied to the other input terminal of each of the mixers for receiving RX_MIX_I and RX_MIX_Q from the fractional synthesizer Frct_Synth. Demodulated test signals at 100 KHz (=1960 MHz−1959.9 MHz) are generated from the outputs of the mixers for receiving RX_MIX_I and RX_MIX_Q by mixing at the mixers for receiving RX_MIX_I and RX_MIX_Q. The demodulated test signals at 100 KHz are transmitted to inputs of buffers BAI and BAQ via the variable gain amplifiers PGAI1 to PGAI3 and PGAQ1 to PGAQ3 and the filters FCI1 to FCI3 and FCQ1 to FCQ3. The demodulated-test transmission signals at 1 MHz of the buffers BAI and BAQ are supplied to the mismatch calibration for receiver circuit 13 via the A/D converters 9 and 10, and the low-pass filters 11 and 12 so as to perform calibration of the amplitude mismatch and phase mismatch.

In the calibration mode for reception of DCS1800, an RF test signal for mismatch calibration for receiver at 1842 MHz is supplied to one input terminal of each of the mixers for receiving RX_MIX_I and RX_MIX_Q from the output of the test signal generating mixer 20 via the switch 2. At this time, a reception local signal at 1841.9 MHz is supplied to the other input terminal of each of the mixers for receiving RX_MIX_I and RX_MIX_Q from the fractional synthesizer Frct_Synth. Demodulated test signals at 100 KHz (=1842 MHz−1841.9 MHz) are generated from the outputs of the mixers for receiving RX_XIX_I and RX_MIX_Q by mixing at the mixers for receiving RX_MIX_I and RX_MIX_Q. Thereafter, calibration of the amplitude mismatch and phase mismatch is performed as similar to the case of PCS1900.

In the calibration mode for reception of GSM900, an RF test signal for mismatch calibration for receiver at 942 MHz is supplied to one input terminal of each of the mixers for receiving RX_MIX_I and RX_MIX_Q from the output of the test signal generating mixer 20 via the switch 2. At this time, a reception local signal at 941.9 MHz is supplied to the other input terminal of each of the mixers for receiving RX_MIX_I and RX_MIX_Q from the fractional synthesizer Frct_Synth. Demodulated test signals at 100 KHz (=942 MHz−941.9 MHz) are generated from the outputs of the mixers for receiving RX_MIX_I and RX_MIX_Q by mixing at the mixers for receiving RX_MIX_I and RX_MIX_Q. Thereafter, calibration of the amplitude mismatch and phase mismatch is performed as similar to the case of PCS1900.

In the calibration mode for reception of GSM850, an RF test signal for mismatch calibration for receiver at 882 MHz is supplied to one input terminal of each of the mixers for receiving RX_MIX_I and RX_MIX_Q from the output of the test signal generating mixer 20 via the switch 2. At this time, a reception local signal at 881.9 MHz is supplied to the other input terminal of each of the mixers for receiving RX_MIX_I and RX_MIX_Q from the fractional synthesizer Frct_Synth. Demodulated test signals at 100 KHz (=882 MHz−881.9 MHz) are generated from the outputs of the mixers for receiving RX_MIX_I and RX_MIX_Q by mixing at the mixers for receiving RX_MIX_I and RX_MIX_Q. Thereafter, calibration of the amplitude mismatch and phase mismatch is performed as similar to the case of PCS1900.

In the "reception mode" of any communication system, the I-phase and Q-phase analog baseband received signals are formed from the outputs of the WCDMA-system reception circuit RX_SPU_WCDMA or the outputs of the other-system reception circuit RX_SPU_GSM. The signals are converted into the I-phase and Q-phase digital baseband received signals by the A/D converters 9 and 10, and then are supplied to the baseband signal processing LSI via the low-pass filters 11 and 12, the mismatch calibration for receiver circuit 13, and the reception-system digital interface 14.

On the contrary, the digital baseband transmission signals TxDBI and TxDBQ from the baseband signal processing LSI are received by the transmission-system digital interface 37 of the RF IC, and then are converted into the I-phase and Q-phase analog baseband transmission signals by the D/A converters 33 and 34. In the case where the transmission system is the WCDMA system, the I-phase and Q-phase analog baseband transmission signals output from the D/A converters 33 and 34 are converted into the RF transmission signals by the WCDMA-system transmission circuit TX_SPU_WCDMA. The operation performed by the WCDMA-system transmission circuit TX_SPU_WCDMA is the same as that performed in the RF IC of FIG. 4. Therefore, the explanation thereof will be omitted. In the case where the transmission system is a system other than the WCDMA system, the I-phase and Q-phase analog baseband transmission signals output from the D/A converters 33 and 34 are converted into the RF transmission signals by the other-system transmission circuit TX_SPU_GSM. The other-system transmission circuit TX_SPU_GSM is configured by a transmission-system offset PLL circuit TX_Offset_PLL.

It is necessary for the transmission-system offset PLL circuit TX_Offset_PLL to adapt to transmission operations for an RF transmission signal Tx_GSM850 of GSM850 and an RF transmission signal Tx_GSM900 of GSM900. Therefore, the oscillation frequency of the Rx-VCO 19 is supplied to one input terminal of a phase-control-feedback frequency down-mixer DWN_MIX_PM via two dividers DIV1 (1/2) and DIV4 (1/2) for which a frequency division ratio is set to 2. A division ratio $N_{IF}$ of an intermediate frequency divider DIV2 ($1/N_{IF}$) coupled to the transmission mixers TX_MIX_I and TX_MIX_Q is set to 26. On the other hand, the oscillation output signal of a Tx VCO 2 is supplied to the other input terminal of the phase-control-feedback frequency down-mixer DWN_MIX_PM via two dividers DIV5 and DIV3 for which a frequency division ratio is set to 2. The input signals from the both terminals are mixed by the phase-control-feedback frequency down-mixer DWN_MIX_PM. Accordingly, a feedback signal at a frequency of a difference between two input signals is formed from the output of the phase-control-feedback frequency down-mixer DWN_MIX_PM, and is supplied to the other input terminal of the phase comparator PC of the transmission-system offset PLL circuit TX_Offset_PLL. In addition, an intermediate-frequency transmission signal $f_{IF}$ which is vector-synthesized and is output from the adder coupled to the outputs of the transmission mixers TX_MIX_I and TX_MIX_Q is supplied, as a reference signal, to one input terminal of the phase comparator PC. The total number of frequency divisions is 52 that is obtained by using 26 of the number $N_{IF}$ of frequency divisions for the intermediate frequency divider DIV2 ($1/N_{IF}$) and 2 of the number of frequency divisions for the 90-degree phase shifter. Accordingly, the frequency of the intermediate frequency transmission signal $f_{IF}$ is 1/52 of the frequency of the Rx-VCO 19. Further, by negative feedback control of the transmission-system offset PLL circuit TX_Offset_PLL, the reference signal of one input terminal of the phase comparator PC coincides with the feedback signal that is output from the down-mixer DWN_MIX_PM so as to be input to the other input terminal of the phase comparator PC. As a result, for transmission operations for the RF transmission signal at 0.8 GHz of GSM850 and the RF transmission signal at 0.9 GHz of GSM900, the Rx-VCO 19 and the Tx VCO 2 may oscillate at a frequency from approximately 3.6 GHz to approximately 3.9 GHz which is approximately four times the transmission frequency. In order to oscillate two voltage controlled oscillators at from 0.8 GHz to 0.9 GHz in the transmission operations of two frequency bands, a variable capacity having an extremely large capacity is needed. As a result, a chip-occupying area and power consumption of the RF IC are increased.

It is necessary for the transmission-system offset PLL circuit TX_Offset_PLL to adapt to transmission operations for an RF transmission signal Tx_DCS1800 of DCS1800 and an RF transmission signal Tx_PCS1900 of PCS1900. Therefore, the oscillation frequency of the Rx-VCO 19 is supplied to one input terminal of the phase-control-feedback frequency down-mixer DWN_MIX_PM via a divider DIV1 (1/2) for which a frequency division ratio is set to 2. The division ratio $N_{IF}$ of the intermediate frequency divider DIV2 (1/$N_{IF}$) coupled to the transmission mixers TX_MIX_I and TX_MIX_Q is set to 26. On the other hand, the oscillation output signal of the Tx VCO 2 is supplied to the other input terminal of the phase-control-feedback frequency down-mixer DWN_MIX_PM via the divider DIV5 for which a frequency division ratio is set to 2. The input signals from the both terminals are mixed by the phase-control-feedback frequency down-mixer DWN_MIX_PM. Accordingly, a feedback signal at a frequency of a difference between two input signals is formed from the output of the phase-control-feedback frequency down-mixer DWN_MIX_PM, and is supplied to the other input terminal of the phase comparator PC of the transmission-system offset PLL circuit TX_Offset_PLL. In addition, the intermediate-frequency transmission signal $f_{IF}$ which is vector-synthesized and is output from the adder coupled to the outputs of the transmission mixers TX_MIX_I and TX_MIX_Q is supplied, as a reference signal, to one input terminal of the phase comparator PC. The total number of frequency divisions is 52 that is obtained by using 26 of the number $N_{IF}$ of frequency divisions for the intermediate frequency divider DIV2 (1/$N_{IF}$) and 2 of the number of frequency divisions for the 90-degree phase shifter. Accordingly, the frequency of the intermediate frequency transmission signal $f_{IF}$ is 1/52 of the frequency of the Rx-VCO 19. Further, by negative feedback control of the transmission-system offset PLL circuit TX_Offset_PLL, the reference signal of one input terminal of the phase comparator PC coincides with the feedback signal that is output from the down-mixer DWN_MIX_PM of the other input terminal of the phase comparator PC. As a result, for transmission operations for the RF transmission signal at 1.7 GHz of DCS1800 and the RF transmission signal at 1.9 GHz of PCS1900, the Rx-VCO 19 and the Tx VCO 2 may oscillate at a frequency from approximately 3.6 GHz to approximately 3.9 GHz which is approximately twice the transmission frequency. In order to oscillate two voltage controlled oscillators at from 1.7 GHz to 1.9 GHz in the transmission operations of two frequency bands, a variable capacity having an extremely large capacity is needed. As a result, a chip-occupying area and power consumption of the RF IC are increased.

Figure 11:
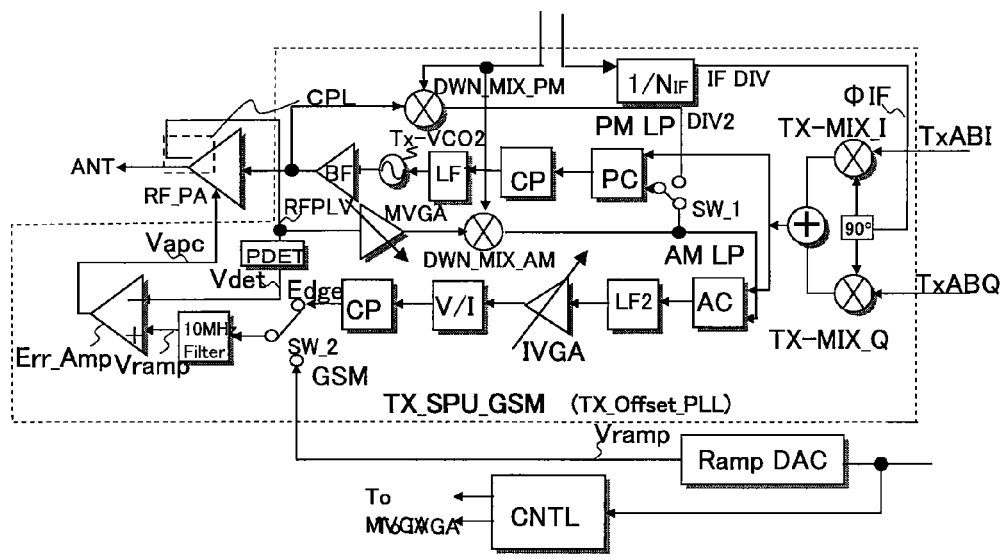
FIG. 11 is a block diagram showing an example of an other-system transmission circuit TX_SPU_GSM shown in FIG. 8.

FIG. 11 is a block diagram showing an example of the other-system transmission circuit TX_SPU_GSM shown in FIG. 8. The RF IC of FIG. 11 employs a polar-loop transmission system in order to adapt to the EDGE system in which the phase modulation and the amplitude modulation are utilized in communications between the base station and the communication terminal device.

In the transmission mode, analog baseband transmission signals TxABI and TxABQ are supplied to one input of each of the transmission mixers TX-MIX_I and TX-MIX_Q. Two IF transmission carrier signals, each having a 90-degree phase, generated by the 90-degree phase shifter using a signal ΦIF of the intermediate frequency divider DIV2 (1/$N_{IF}$) are input to the other input of each of the transmission mixers TX-MIX_I and TX-MIX_Q. As a result, in the transmission mixers TX-MIX_I and TX-MIX_Q, the frequencies of the analog baseband transmission signals are up-converted into those of the IF transmission signals, and one IF transmission modulated signal that is vector-synthesized can be obtained from the adder. The IF transmission modulated signal from the adder is supplied to one input of the phase comparator PC that configures a PM loop circuit PM LP for transmission of phase modulated components. In the PM loop circuit PM LP, the output of the phase comparator PC is transmitted to a control input of the Tx VCO 2 via a charge pump CP and a low-pass filter LF1.

The output of the Tx VCO 2 via a buffer amplifier BF is supplied to an input of the PM-loop frequency down-mixer DWN_MIX_PM, so that a first IF transmission feedback signal can be obtained from the output of the PM-loop frequency down-mixer DWN_MIX_PM. The first IF transmission feedback signal having phase-modulated information in the case where the transmission operation is performed by the GSM system is supplied to the other input of the phase comparator PC that configures the PM loop circuit PM LP via a switch SW_1. As a result, a transmission signal that is an output of a transmission RF power amplifier RF_PA includes precise phase- modulated information of the GSM system. Further, transmission power information (the amplified gain of the transmission RF power amplifier RF_PA) in the case where the transmission operation is performed by the GSM system is designated by a ramp output voltage Vramp of a ramp signal D/A converter Ramp DAC inside the RF IC. The ramp output voltage Vramp is supplied to a 10 MHZ filter via the switch SW2. The ramp output voltage Vramp from the filter and a transmission power detection signal Vdet from a power coupler CPL and a power detection circuit PDET that detect the transmission power of the transmission RF power amplifier RF_PA are supplied to an error amplifier Err_Amp. By power voltage control or bias voltage control with an automatic power control voltage Vapc output from the error amplifier Err_Amp, the amplified gain of the transmission RF power amplifier RF_PA is set in proportion to a distance between the base station and the mobile communication terminal device. A digital ramp input signal that is supplied from the baseband signal processing LSI to the ramp signal D/A converter Ramp DAC is a transmission-power-level indicating signal that indicates the level of the transmission power, and allows the transmission power level to be controlled at a high level in proportion to a distance between the base station and the communication terminal device. An analog ramp output voltage Vramp is generated from the output of the ramp signal D/A converter Ramp DAC.

On the other hand, in the case where the transmission operation is performed by the EDGE system, the IF transmission modulated signal from the adder coupled to the transmission mixers TX-MIX_I and TX-MIX_Q includes not only the phase-modulated information, but also amplitude-modulated information. Accordingly, the IF transmission modulated signal from the adder is supplied to not only one input of the phase comparator PC that configures the PM loop circuit PM LP, but also one input of an amplitude comparator AC that configures the AM loop circuit AM LP. At this time, the output of the transmission oscillator Tx-VCO 2 is not supplied to the other input of the phase comparator PC via the PM-loop frequency down-mixer DWN_MIX_PM. Instead, information (RF transmission power level RFPLV) related to the transmission power of the transmission RF power amplifier RF_PA is supplied to the other input of the phase comparator PC. The supplying route is the power coupler CPL, a variable gain circuit MVGA, and the AM-loop frequency down-mixer DWN_MIX_AM in this order. Further, the information (RF transmission power level RFPLV) related to the transmission power of the transmission RF power amplifier RF_PA is supplied even to the other input of the amplitude comparator AC that configures the AM loop circuit AM LP. The supplying route is also the power coupler CPL, the variable gain circuit MVGA, and the AM-loop frequency down-mixer DWN_MIX_AM in this order. In the AM loop circuit AM LP, the output of the amplitude comparator AC is supplied to the 10 MHz filter via a low-pass filter LF2, a variable gain circuit IVGA, a voltage/current converter V/I, the charge pump CP, and the switch S2. As a result, the transmission power signal output from the transmission RF power amplifier RF_PA that amplifies the RF oscillation output signal of the transmission oscillator Tx-VCO includes precise phase-modulated information of the EDGE system by the PM loop circuit PM LP. Further, the transmission power signal output from the transmission RF power amplifier RF_PA includes precise amplitude-modulated information of the EDGE system by the AM loop circuit AM LP.

As the power coupler CPL for detecting the transmission power of the transmission RF power amplifier RF_PA, a coupler for electromagnetically or capacitively detecting the transmission power of the transmission RF power amplifier RF_PA can be employed. As the power coupler CPL, other than the above, a current-sense coupler can be employed. In the current-sense coupler, a small detected-DC/AC-operation-current in proportion to a DC/AC operation current of a power amplifying element in the final stage of the transmission RF power amplifier RF_PA is supplied to a detection amplifying element.

A control circuit CNTL generates two control signals, each having 8 bits, in response to a digital ramp signal having 10 bits in order that the directions of the gains of two variable gain circuits MVGA and IVGA of the AM loop circuit AM LP in response to the ramp voltage Vramp of the ramp signal D/A converter Ramp DAC are made opposite in the RF IC of FIG. 11. Specifically, when the gain of the variable gain circuit MVGA is decreased in response to the ramp voltage Vramp, the sum of the gains of two variable gain circuits MVGA and IVGA is made substantially constant by increasing the gain of the variable gain circuit IVGA. As a result, the phase margin of open loop frequency characteristics in the AM loop circuit AM LP is suppressed from extremely decreasing in response to the ramp voltage Vramp.

Figure 12:
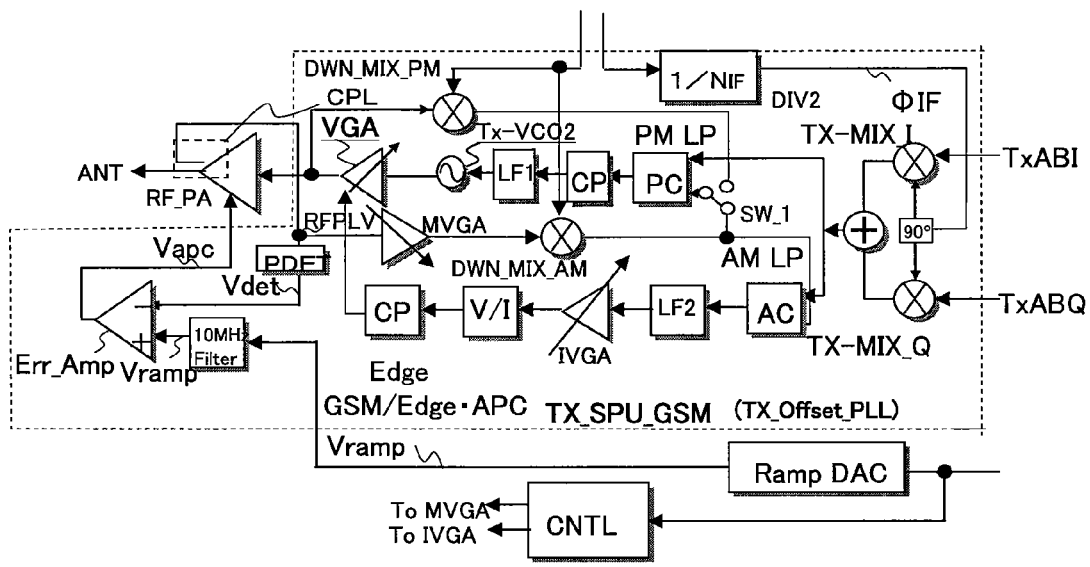
FIG. 12 is a block diagram showing another example of the other-system transmission circuit TX_SPU_GSM shown in FIG. 8.

FIG. 12 is a block diagram showing another example of the other-system transmission circuit TX_SPU_GSM shown in FIG. 8. Specifically, the other-system transmission circuit TX_SPU_GSM shown in FIG. 12 is configured by a polar modulator system in order to adapt to the EDGE system in which the phase modulation and the amplitude modulation are utilized in communications with the base station.

Specifically, an amplitude modulation loop controlling circuit AM_LP that controls the amplitude of the RF transmission output signal from the transmission RF power amplifier RF_PA on the basis of the transmission intermediate-frequency signal formed by the transmission mixers TX_MIX_I and TX_MIX_Q is configured as follows.

In the AM loop circuit AM LP, the output of the amplitude comparator AC is supplied to a variable gain amplifier VGA for amplitude modulation coupled to the output of the Tx VCO 2 via the low-pass filter LF2, the variable gain circuit IVGA, the voltage/current converter V/I, and the charge pump CP. The transmission intermediate-frequency signal formed by the transmission mixers TX_MIX_I and TX_MIX_Q is supplied to one input terminal of the phase comparator AC of the AM loop circuit AMLP. Information (RF transmission power level RFPLV) related to the transmission power of the transmission RF power amplifier RF_PA is supplied to the other input terminal of the phase comparator AC via the power coupler CPL, the variable gain circuit MVGA, and the AM-loop frequency down-mixer DWN_MIX_AM. As a result, the gain of the variable gain amplifier VGA for amplitude modulation is controlled by the output of the amplitude comparator AC via the low-pass filter LF2, the variable gain circuit IVGA, the voltage/current converter V/I, and the charge pump CP, so that the amplitude of the IF signal of the one input terminal of the amplitude comparator AC coincides with that of the IF signal of the other input terminal of the amplitude comparator AC. As a result, the transmission power of the transmission RF power amplifier RF_PA includes precise amplitude-modulated information of the EDGE system.

Also in the case of the GSM system and the EDGE system, the ramp output voltage Vramp of the ramp signal D/A converter Ramp DAC and the transmission power detecting signal Vdet from the power coupler CPL and the power detecting circuit PDET that detect the transmission power of the transmission RF power amplifier 203 are supplied to the error amplifier Err_Amp. By power voltage control or bias voltage control with the automatic power control voltage Vapc output from the error amplifier Err_Amp, the amplified gain of the transmission RF power amplifier RF_PA is set in proportional to a distance between the base station and the mobile communication terminal device so as to perform the APC control <<Configuration of Mobile Phone>>

Figure 9:
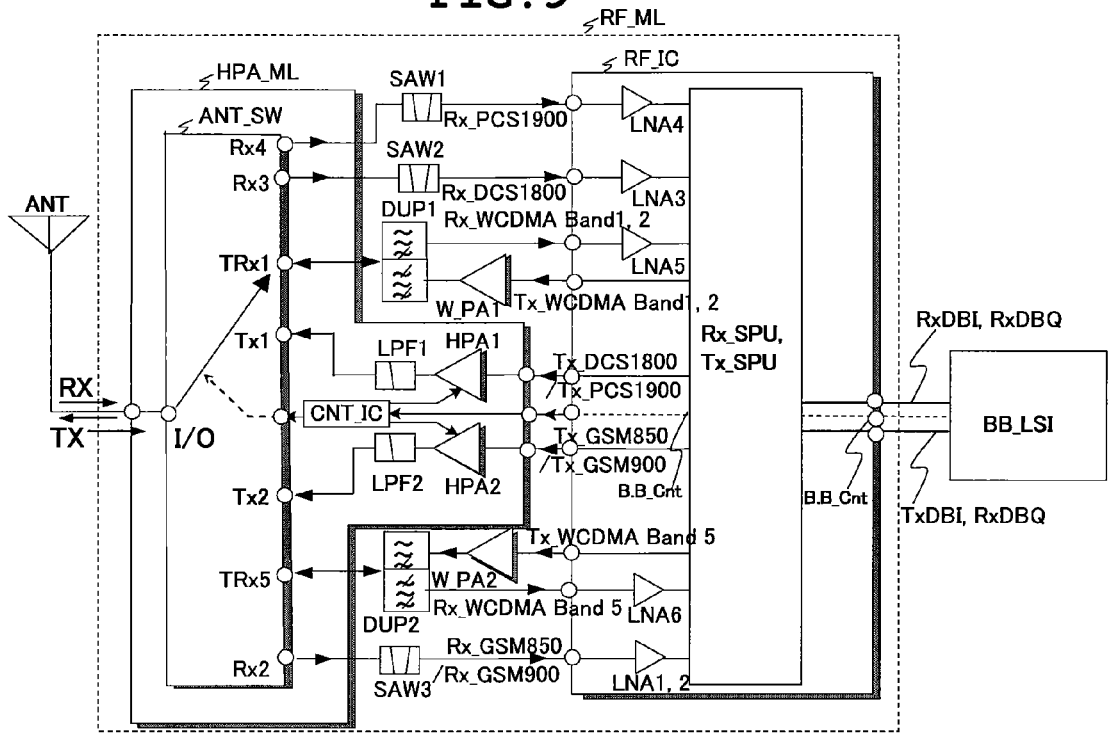
FIG. 9 is a block diagram showing a configuration of a mobile phone in which the RF IC according to the various embodiments of the present invention, an RF module incorporating an antenna switch MMIC and an RF power amplifier, and a baseband signal processing LSI are mounted.

FIG. 9 is a block diagram showing a configuration of a mobile phone in which the RF IC according to various embodiments of the present invention described above, an RF module incorporating an antenna switch MMIC and an RF power amplifier, and the baseband signal processing LSI are mounted.

In FIG. 9, a common input/output terminal I/O of the antenna switch MMIC (ANT_SW) of the RF module RF_ML is coupled to the transmission/reception antenna ANT of the mobile phone. A control signal B.B_Cnt from the baseband signal processing LSI (BB_LSI) is supplied to a controller integrated circuit (CNT_IC) of a high-output-power amplifier module (HPA_ML) via the RF analog signal processing semiconductor integrated circuit (RF_IC). The flow of the RF signal from the transmission/reception antenna ANT to the common input/output terminal I/O corresponds to a reception operation RX of the mobile phone, and the flow of the RF signal from the common input/output terminal I/O to the transmission/reception antenna ANT corresponds to a transmission operation TX of the mobile phone.

The RF IC (RF_IC) performs frequency up-conversion for a transmission baseband signal Tx_BBS output from the baseband signal processing LSI (BB_LSI) into the RF transmission signal. On the contrary, the RF IC (RF_IC) performs frequency down-conversion for the RF received signal received by the transmission/reception antenna ANT into a reception baseband signal Rx_BBS to be supplied to the baseband signal processing LSI (BB_LSI).

The antenna switch MMIC (ANT_SW) of the RF module RF_ML establishes a signal route between the common input/output terminal I/O and any terminal among transmission terminals Tx1 and Tx2, reception terminals Rx2, Rx3, and Rx4, and transmission/reception terminals TRx1 and TRx5, so that any one of the reception operation RX and the transmission operation TX is performed. The switch for the transmission/reception operation of the RF signal is configured by an HEMT (High-electron-mobility transistor), and the antenna switch MMIC is configured by a microwave monolithic integrated circuit (MIC) formed by using a compound semiconductor, such as GaAs. In the antenna switch MMIC (ANT_SW), a required isolation can be obtained by setting the impedance of a signal route, other than the signal route established for any one of the reception operation RX and the transmission operation TX, at an extremely high value. In the field of the antenna switch, the common input/output terminal I/O is called Single Pole, and seven terminals in total of the transmission terminals Tx1 and Tx2, the reception terminals Rx2, Rx3, and Rx4, and the transmission/reception terminals TRx1 and TRx5 are called 7 throw.

Accordingly, the antenna switch MMIC (ANT_SW) in FIG. 9 is a switch of a single pole 7 throw (SP7T) type.

The baseband signal processing LSI (BB_LSI) is coupled to an external nonvolatile memory (not shown) and an application processor (not shown). The application processor is coupled to a liquid crystal display device (not shown) and a key input device (not shown), and can execute various application programs including general-purpose programs and games. Various application programs such as a boot program (start initialize program) of a mobile device such as a mobile phone, an operating system program (OS), and a program for phase modulation of a reception baseband signal of the GSM system or the like and phase modulation of a transmission baseband signal of the GSM system or the like performed by a digital signal processor (DSP) mounted inside the baseband signal processing LSI can be stored into the external nonvolatile memory.

<<Transmission/reception Operation of GSM850 and GSM900>>

There will be assumed a case in which the frequencies of the transmission baseband signals TxDBI and TxDBQ from BB_LSI are up-converted into the band of GSM850. In this case, a transmission signal processing unit Tx_SPU of the RF IC up-converts the frequencies of the transmission baseband signals into the band of GSM850, so as to generate an RF transmission signal Tx_GSM850 of GSM850. There will be assumed a case in which the frequencies of the transmission baseband signals from BB_LSI are up-converted into the band of GSM900. In this case, the transmission signal processing unit Tx_SPU of the RF IC up-converts the frequencies of the transmission baseband signals into the band of GSM900, so as to generate an RF transmission signal Tx_GSM900 of GSM900. The RF transmission signal Tx_GSM850 of GSM850 and the RF transmission signal Tx_GSM900 of GSM900 are power-amplified by a high-output-power amplifier HPA2 of the high-output-power amplifier module (HPA_ML). The RF output of the high-output-power amplifier HPA2 is supplied to the transmission terminal Tx2 of the antenna switch MMIC (ANT_SW) via a low-pass filter LPF2. The RF transmission signal Tx_GSM850 of GSM850 and the RF transmission signal Tx_GSM900 of GSM900 supplied to the transmission terminal Tx2 can be transmitted from the transmission/reception antenna ANT via the common input/output terminal I/O.

An RF received signal Rx_GSM850 of GSM850 and an RF received signal Rx_GSM900 of GSM900 received by the transmission/reception antenna ANT are supplied to the common input/output terminal I/O of the antenna switch MMIC (ANT_SW). The RF received signal Rx_GSM850 of GSM850 and the RF received signal Rx_GSM900 of GSM900 obtained from the reception terminal Rx2 of the antenna switch MMIC (ANT_SW) are amplified by the low-noise amplifiers LNA1 and LNA2 of the RF IC via a surface acoustic wave filter SAW3. Thereafter, these RF received signals are supplied to a received signal processing unit Rx_SPU. In the received signal processing unit Rx_SPU, the frequency of the RF received signal Rx_GSM850 of GSM850 or the RF received signal Rx-GSM900 of GSM900 is down-converted into the reception baseband signals RxDBI and RxDBQ.

In the transmission/reception mode of GSM850, the antenna switch MMIC transmits, in a time division manner, the RF transmission signal Tx_GSM850 with the connection between the input/output terminal I/O and the transmission terminal Tx2 in response to the control signal B.B_Cnt, and the antenna switch MMIC receives, in a time division manner, the RF received signal Rx_GSM850 with the connection between the input/output terminal I/O and the reception terminal Rx2 in response to the control signal B.B_Cnt. As similar to the above, also in the transmission/reception mode of GSM900, the antenna switch MMIC transmits, in a time division manner, the RF transmission signal Tx_GSM900 with the connection between the input/output terminal I/O and the transmission terminal Tx2 in response to the control signal B.B_Cnt, and the antenna switch MMIC receives, in a time division manner, the RF received signal Rx_GSM900 with the connection between the input/output terminal I/O and the reception terminal Rx2 in response to the control signal B.B_Cnt.

<<Transmission/reception Operation of DCS1800 and PCS1900>>

There will be assumed a case in which the frequencies of the transmission baseband signals TxDBI and TxDBQ from BB_LSI are up-converted into the band of DCS1800. In this case, the transmission signal processing unit Tx_SPU of the RF IC up-converts the frequencies of the transmission baseband signals into the band of DCS1800, so as to generate an RF transmission signal Tx_DCS1800 of DCS1800. There will be assumed a case in which the frequencies of the transmission baseband signals from BB_LSI are up-converted into the band of PCS1900. In this case, the transmission signal processing unit Tx_SPU of the RF IC up-converts the frequencies of the transmission baseband signals into the band of PCS1900, so as to generate an RF transmission signal Tx_PCS1900 of PCS1900. The RF transmission signal Tx_DCS1800 of DCS1800 and the RF transmission signal Tx_PCS1900 of PCS1900 are power-amplified by a high-output-power amplifier HPA1 of the high-output-power amplifier module (HPA_ML). The RF output of the high-output-power amplifier HPA1 is supplied to the transmission terminal Tx1 of the antenna switch MMIC (ANT_SW) via a low-pass filter LPF1. The RF transmission signal Tx_DCS1800 of DCS1800 and the RF transmission signal Tx_PCS1900 of PCS1900 supplied to the transmission terminal Tx1 can be transmitted from the transmission/reception antenna ANT via the common input/output terminal I/O.

An RF received signal Rx_DCS1800 of DCS1800 and an RF received signal Rx_PCS1900 of PCS1900 received by the transmission/reception antenna ANT are supplied to the common input/output terminal I/O of the antenna switch MMIC. The RF received signal Rx_DCS1800 of DCS1800 obtained from the reception terminal Rx3 of the antenna switch MMIC is amplified by the low-noise amplifier LNA2 of the RF IC via a surface acoustic wave filter SAW2. The RF received signal Rx_PCS1900 of PCS1900 obtained from the reception terminal Rx4 of the antenna switch MMIC (ANT_SW) is amplified by the low-noise amplifier LNA1 of the RF IC via a surface acoustic wave filter SAW1. Thereafter, the RF received signal Rx_DCS1800 of DCS1800 and the RF received signal Rx_PCS1900 of PCS1900 are supplied to the received signal processing unit Rx_SPU. In the received signal processing unit Rx_SPU, the frequency of the RF received signal Rx_DCS1800 of DCS1800 or the RF received signal Rx_PCS1900 of PCS1900 is down-converted into the reception baseband signals RxDBI and RxDBQ.

In the transmission/reception mode of DCS1800, the antenna switch MMIC transmits, in a time division manner, the RF transmission signal Tx_DCS1800 with the connection between the input/output terminal I/O and the transmission terminal Tx1 in response to the control signal B.B_Cnt, and the antenna switch MMIC receives, in a time division manner, the RF received signal Rx_DCS1800 with the connection between the input/output terminal I/O and the reception terminal Rx3 in response to the control signal B.B_Cnt. As similar to the above, also in the transmission/reception mode of PCS1900, the antenna switch MMIC transmits, in a time division manner, the RF transmission signal Tx_PCS1900 with the connection between the input/output terminal I/O and the transmission terminal Tx1 in response to the control signal B.B_Cnt, and the antenna switch MMIC receives, in a time division manner, the RF received signal Rx_PCS1900 with the connection between the input/output terminal I/O and the reception terminal Rx4 in response to the control signal B.B_Cnt.

<<Transmission/reception Operation of WCDMA>>

There will be assumed a case in which the frequencies of the transmission baseband signals TxDBI and TxDBQ from the baseband signal processing LSI (BB_LSI) are up-converted into Band1 or Band2 of the WCDMA system. In this case, the transmission signal processing unit Tx_SPU of the RF IC up-converts the frequencies of the transmission baseband signals into Band1 or Band2 of the WCDMA system. RF transmission signals Tx_WCDMA Band1 and Band2 of Band1 or Band2 of the WCDMA system are power-amplified by a high-output-power amplifier W_PA1, and are supplied to the transmission/reception terminal TRx1 of the antenna switch MMIC via a duplexer DUP1. The RF transmission signals Tx_WCDMA Band1 and Band2 of Band1 or Band2 of the WCDMA system supplied to the transmission/reception terminal TRx1 can be transmitted from the transmission/reception antenna ANT via the common input/output terminal I/O.

In the WCDMA system, the transmission operation and the reception operation can be processed in parallel in a code division manner. Specifically, RF received signals Rx_WCDMA Band1 and Band2 of Band1 or Band2 of the WCDMA system received by the transmission/reception antenna ANT are supplied to the common input/output terminal I/O of the antenna switch MMIC. The RF received signals Rx_WCDMA Band1 and Band2 of Band1 or Band2 of the WCDMA system obtained from the transmission/reception terminal TRx1 of the antenna switch MMIC are amplified by a low-noise amplifier LNA5 of the RF IC via the duplexer DUP1, and then are supplied to the received signal processing unit Rx_SPU. In the received signal processing unit Rx_SPU, the frequencies of the RF received signals Rx_WCDMA Band1 and Band2 of Band1 or Band2 of the WCDMA system are down-converted into the reception baseband signals RxDBI and RxDBQ. In the parallel processing mode of transmission and reception of Band1 and Band2 in the WCDMA system, the antenna switch MMIC allows for transmission of the RF transmission signals and reception of the RF received signals in parallel, with the steady connection between the input/output terminal I/O and the transmission/reception terminal TRx1 in response to the control signal B.B_Cnt.

There will be assumed a case in which the frequencies of the transmission baseband signals TxDBI and TxDBQ from the baseband signal processing LSI (BB_SI) are up-converted into Band5 of the WCDMA system. In this case, the transmission signal processing unit Tx_SPU of the RF IC up-converts the frequencies of the transmission baseband signals TxDBI and TxDBQ into Band5 of the WCDMA system. RF transmission signals Tx_WCDMA Band5 of Band5 of the WCDMA system are power-amplified by a high-output-power amplifier W_PA2, and are supplied to the transmission/reception terminal TRx5 of the antenna switch MMIC via a duplexer DUP2. The RF transmission signals Tx_WCDMA Band5 of Band5 of the WCDMA system supplied to the transmission/reception terminal TRx5 can be transmitted from the transmission/reception antenna ANT via the common input/output terminal I/O.

An RF received signal Rx_WCDMA Band5 of Band5 of the WCDMA system received by the transmission/reception antenna ANT is supplied to the common input/output terminal I/O of the antenna switch MMIC. The RF received signal Rx_WCDMA Band5 of Band5 of the WCDMA system obtained from the transmission/reception terminal TRx5 of the antenna switch MMIC is amplified by a low-noise amplifier LNA6 of the RF IC via the duplexer DUP2. The amplified signal from the low-noise amplifier LNA6 is supplied to the received signal processing unit Rx_SPU. In the received signal process unit Rx_SPU, the frequency of the RF received signal Rx_WCDMA Band5 of Band5 of the WCDMA system is down-converted into the reception baseband signals RxDBI and RxDBQ.

In the parallel processing mode of transmission and reception of Band5 in the WCDMA system, the antenna switch MMIC allows for transmission of the RF transmission signals and reception of the RF received signals in parallel, with the steady connection between the input/output terminal I/O and the transmission/reception terminal TRx5 in response to the control signal B.B_Cnt.

The invention achieved by the inventors has been described in detail on the basis of the embodiments. However, it is obvious that the invention is not limited to the embodiments, but various modifications can be made in a range without departing from the gist of the invention.

For example, the mixers for receiving 3 and 4 of the RF IC in FIG. 4 are not limited to the direct down-conversion method in which the RF amplified signal of the low-noise amplifier 1 is converted into the I-phase and Q-phase baseband signals. The mixers for receiving 3 and 4 of the RF IC in FIG. 4 can employ a method in which the RF received signal is converted into a low IF (low intermediate-frequency signal), as similar to the patent document 2.

Further, during the calibration mode of the RF IC in FIG. 4, the DC offset voltage of the variable gain amplifiers 7 and 8 can be calibrated. During that time, the cut-off frequency of the low-pass filters 5, 6, 11, and 12 can be calibrated.

Furthermore, the baseband signal processing LSI and the application processor are configured on different semiconductor chips in the above-described embodiments. However, as another embodiment, there can be employed an integrated one-chip semiconductor in which the application processor is integrated into the semiconductor chip of the baseband signal processing LSI.

What is claimed is:

1. A radio frequency integrated circuit that is mounted in a wireless communication terminal and has a function of performing multiband radio frequency communications with a base station, the radio frequency integrated circuit comprising:
   a low-noise amplifier;
   mixers for receiving;
   a voltage-controlled oscillator for receiver circuit;
   demodulated signal processing circuits; and
   a mismatch calibration for receiver circuit,
   wherein the low-noise amplifier amplifies an RF received signal received by an antenna of the wireless communication terminal,
   wherein the RF amplified signal of the low-noise amplifier is supplied to one input terminal of each of the mixers for receiving, wherein a reception local signal based on an oscillation output of the voltage-controlled oscillator for receiver circuit is supplied to the other input terminal of each of the mixers for receiving, wherein the demodulated signal processing circuits process orthogonal demodulated received signals from output terminals of the mixers for receiving, wherein the RF received signal with a maximum frequency band having a maximum frequency among a plurality of frequency bands of the multiband radio frequency communications can be processed by the mixers for receiving and the demodulated signal processing circuits in a reception mode of the integrated circuit, wherein a mismatch calibration for receiver circuit calibrates mismatch of the orthogonal demodulated received signals from output terminals of the demodulated signal processing circuits in a calibration mode of the integrated circuit, wherein the integrated circuit further includes modulated signal processing circuits, transmission mixers, and a transmission voltage-controlled oscillator, wherein the modulated signal processing circuits process an orthogonal transmission signal, wherein an orthogonal transmission output signal of the modulated signal processing circuits is supplied to one input terminal of each of the transmission mixers, wherein a respective transmission local signal based on an oscillation output of the transmission voltage-controlled oscillator is supplied to the other input terminal of each of the transmission mixers, wherein an RF transmission signal with the maximum frequency band of the multiband radio frequency communications can be generated from outputs of the transmission mixers based on the oscillation output of the transmission voltage-controlled oscillator in a transmission mode of the integrated circuit, wherein the integrated circuit further includes an RF test signal generating unit which generates an RF test signal for mismatch calibration performed by the mismatch calibration for receiver circuit in the calibration mode of the integrated circuit and which supplies the RF test signal to the one input terminal of each of the mixers for receiving, wherein the RF test signal generating unit generates the RF test signal using the oscillation output signal of the transmission voltage-controlled oscillator in the calibration mode, and wherein the RF test signal generated by the RF test signal generating unit in the calibration mode has a frequency within the RF reception frequency band of the RF received signal that is higher than that of the RF transmission signal with the maximum frequency band among the frequency bands of the multiband radio frequency communications, wherein the frequency of the RF received signal and the frequency of the RF transmission signal with the maximum frequency band of the multiband radio frequency communications are set to approximately 2110 MHz to 2170 MHz and approximately 1920 MHz to 1980 MHz of the WCDMA system, respectively, wherein the integrated circuit further includes other low-noise amplifiers, other mixers for receiving, and other demodulated signal processing circuits, wherein the other low-noise amplifiers are configured to amplify an RF received signal of any system, among GSM850, GSM900, DCS1800, and PCS1900, which is received by the antenna of the wireless communication terminal, wherein the RF amplified signals of the other low-noise amplifiers are supplied to first input terminals of the other mixers for receiving, wherein the reception local signal based on the oscillation output of the voltage-controlled oscillator for receiver circuit is supplied to the second input terminals of the other mixers for receiving, wherein the other demodulated signal processing circuits process other orthogonal demodulated received signals from output terminals of the other mixers for receiving, wherein an RF received signal of the PCS1900 system can be processed by the other mixers for receiving and the other demodulated signal processing circuits in the reception mode of the integrated circuit, wherein the mismatch calibration for receiver circuit calibrates mismatch of the orthogonal demodulated received signals from output terminals of the other demodulated signal processing circuits in the calibration mode of the integrated circuit, wherein the integrated circuit further includes other transmission mixers and a transmission-system offset PLL circuit, wherein the modulated signal processing circuits are configured to process an orthogonal transmission signal of any system among GSM850, GSM900, DCS1800, and PCS1900, wherein the orthogonal transmission output signal of any system, among GSM850, GSM900, DCS1800 and PCS1900, which is output from the modulated signal processing circuits, is supplied to first input terminals of the other transmission mixers, an intermediate frequency signal is supplied to second input terminals of the other transmission mixers, and an intermediate frequency transmission signal output from the other transmission mixers is supplied to an input of the transmission-system offset PLL circuit, wherein an RF transmission signal of any system among GSM850, GSM900, DCS1800, and PCS1900 can be generated from an output of the transmission-system offset PLL circuit in the transmission mode of the integrated circuit, and wherein the RF test signal, having a frequency of approximately 1930 MHz to 1990 MHz that is the frequency of the RF received signal of the PCS1900 system, generated by the RF test signal generating unit in the calibration mode of the integrated circuit is supplied to the other input terminal of each of the mixers for receiving.

2. The radio frequency integrated circuit according to claim 1, wherein each of the modulated signal processing circuits includes one of a polar loop system and a polar modulator system adapted to an EDGE system in which amplitude modulation as well as phase modulation is utilized, and wherein the transmission-system offset PLL circuit includes a phase loop for phase modulation of said one of the polar loop system and the polar modulator system, and an amplitude loop for amplitude modulation of said one of the polar loop system and the polar modulator system.

3. The radio frequency integrated circuit according to claim 1, wherein the demodulated signal processing circuits of the integrated circuit include A/D converters that convert analog signals of the orthogonal demodulated received signals from the output terminals of the mixers for receiving into digital signals, wherein the modulated signal processing circuits of the integrated circuit include D/A converters that convert digital signals of the orthogonal transmission output signals of the modulated signal processing circuits into analog signals, wherein the integrated circuit includes digital interfaces which output the digital orthogonal demodulated received signals to an LSI that performs baseband signal processing and to which the digital orthogonal transmission output signals are supplied from the LSI, wherein the integrated circuit further includes a digital interface reference signal generating unit which generates a digital interface reference signal supplied to the digital interfaces, and wherein the RF test signal generating unit generates the RF test signal using the oscillation output signal of the transmission voltage-controlled oscillator and an output signal of the digital interface reference signal generating unit in the calibration mode.

4. The radio frequency integrated circuit according to claim 1, wherein the integrated circuit further includes a system reference voltage-controlled oscillator which generates a system reference signal used when generating the reception local signal and the transmission local signal, and wherein the RF test signal generating unit generates the RF test signal using the oscillation output signal of the transmission voltage-controlled oscillator and the oscillation output signal of the system reference voltage-controlled oscillator in the calibration mode.

5. The radio frequency integrated circuit according to claim 1, wherein the integrated circuit further includes a fractional divider in which a number of frequency divisions includes a fraction and whose input is coupled to an output of the transmission voltage-controlled oscillator, and wherein the RF test signal generating unit generates the RF test signal based on an output of the fractional divider to the input of which the oscillation output signal of the transmission voltage-controlled oscillator is supplied.

6. The radio frequency integrated circuit according to claim 1, wherein the integrated circuit further includes a controlling circuit which controls the transmission voltage-controlled oscillator in the calibration mode, wherein the frequency of the oscillation output signal of the transmission voltage-controlled oscillator is controlled in the calibration mode so as to be lower than that of the oscillation output signal of the transmission voltage-controlled oscillator in the transmission mode of the integrated circuit, in any frequency band among the frequency bands of the multiband radio frequency communications, and wherein, in the calibration mode, the RF test signal generating unit generates, as the RF test signal, the oscillation output signal of the transmission voltage-controlled oscillator which is controlled by the controlling circuit.

7. A radio frequency integrated circuit that is mounted in a wireless communication terminal and has a function of performing multiband radio frequency communications with a base station, the radio frequency integrated circuit performing frequency up-conversion from an orthogonal transmission signal from an LSI that performs baseband signal processing into an RF transmission signal by transmission mixers, performing frequency down-conversion from an RF received signal received by an antenna into an orthogonal demodulated received signal by mixers for receiving, in the frequency up-conversion, the transmission mixers supply a transmission local signal based on an output of a transmission voltage-controlled oscillator, in the frequency down-conversion, the mixers for receiving are supplied with a reception local signal based on an output of a voltage-controlled oscillator for receiver circuit, orthogonal demodulated reception output signals being generated from outputs of the mixers for receiving by demodulated signal processing circuits, the radio frequency integrated circuit comprising:

an RF test signal generating unit which generates an RF test signal in a calibration mode of the integrated circuit and supplies the RF test signal to the mixers for receiving; and a mismatch calibration for receiver circuit which calibrates mismatch of the received orthogonal demodulated signals of the demodulated signal processing circuits based on outputs of the mixers for receiving to which the RF test signal is supplied in the calibration mode of the integrated circuit, so that the mismatch calibration for receiver circuit reduces mismatch of the received orthogonal demodulated signals of the demodulated signal processing circuits based on the outputs of the mixers for receiving that respond to the RF received signal in a reception mode of the integrated circuit, wherein the RF test signal generating unit generates the RF test signal using an oscillation output signal of the transmission voltage-controlled oscillator in the calibration mode, and wherein the RF test signal generated by the RF test signal generating unit in the calibration mode has a frequency within an RF reception frequency band of the RF received signal that is higher than that of the RF transmission signal with a maximum frequency band among a plurality of frequency bands of the multiband radio frequency communications, wherein the integrated circuit further includes a low-noise amplifier, wherein the low-noise amplifier amplifies the RF received signal received by the antenna, wherein the RF amplified signal from the low-noise amplifier is supplied to one input terminal of each of the mixers for receiving, wherein the reception local signal based on the oscillation output of the voltage-controlled oscillator for receiver circuit is supplied to the other input terminal of each of the mixers for receiving, wherein the demodulated signal processing circuits process orthogonal demodulated received signals from output terminals of the mixers for receiving, wherein the RF received signal with the maximum frequency band having the maximum frequency band of the multiband radio frequency communications can be processed by the mixers for receiving and the demodulated signal processing circuits in the reception mode of the integrated circuit, wherein the integrated circuit further includes modulated signal processing circuits, wherein the modulated signal processing circuits process an orthogonal transmission signal, wherein an orthogonal transmission output signal from the modulated signal processing circuits is supplied to one input terminal of each of the transmission mixers, and the transmission local signal based on the oscillation output of the transmission voltage-controlled oscillator is supplied to the other input terminal of each of the transmission mixers, wherein the RF transmission signal with the maximum frequency band of the multiband radio frequency communications can be generated from the outputs of the transmission mixers based on the oscillation output of the transmission voltage-controlled oscillator in a transmission mode of the integrated circuit, wherein the integrated circuit further includes other low-noise amplifiers, other mixers for receiving, and other demodulated signal processing circuits, wherein the other low-noise amplifiers are configured to amplify an RF received signal of any system, among GSM850, GSM900, DCS1800, and PCS1900, which is received by the antenna of the wireless communication terminal, wherein the RF amplified signals of the other low-noise amplifiers are supplied to first input terminals of the other mixers for receiving, wherein the reception local signal based on the oscillation output of the voltage-controlled oscillator for receiver circuit is supplied to second input terminals of the other mixers for receiving, wherein the other demodulated signal processing circuits process other orthogonal demodulated received signals from output terminals of the other mixers for receiving, wherein an RF received signal of the PCS1900 system can be processed by the other mixers for receiving and other demodulated signal processing circuits in the reception mode of the integrated circuit, wherein the mismatch calibration for receiver circuit calibrates mismatch of the orthogonal demodulated received signals from output terminals of the other demodulated signal processing circuits in the calibration mode of the integrated circuit, wherein the integrated circuit further includes the other transmission mixers and a transmission-system offset PLL circuit, wherein the modulated signal processing circuits are configured to process an orthogonal transmission signal of any system among GSM850, GSM900, DCS1800, and PCS1900, wherein the orthogonal transmission output signal of any system, among GSM850, GSM900, DCS1800, and PCS1900, which is output from the modulated signal processing circuits, is supplied to first input terminals of the other transmission mixers, an intermediate frequency signal is supplied to second input terminals of the other transmission mixers, and an intermediate frequency transmission signal output from the other transmission mixers is supplied to an input of the transmission-system offset PLL circuit, wherein an RF transmission signal of any system among GSM850, GSM900, DCS1800, and PCS1900 can be generated from an output of the transmission-system offset PLL circuit in the transmission mode of the integrated circuit, and wherein the RF test signal, having a frequency of approximately 1930 MHz to 1990 MHz that is the frequency of the RF received signal of the PCS1900 system, generated by the RF test signal generating unit in the calibration mode of the integrated circuit is supplied to the other input terminal of each of the mixers for receiving.

8. The radio frequency integrated circuit according to claim 7, wherein the frequency of the RF received signal and the frequency of the RF transmission signal with the maximum frequency band of the multiband radio frequency communications are set to approximately 2110 MHz to 2170 MHz and approximately 1920 MHz to 1980 MHz of the WCDMA system, respectively.

9. The radio frequency integrated circuit according to claim 7, wherein each of the modulated signal processing circuits includes one of a polar loop system and a polar modulator system adapted to an EDGE system in which amplitude modulation as well as phase modulation is utilized, and wherein the transmission-system offset PLL circuit includes a phase loop for phase modulation of said one of the polar loop system and the polar modulator system, and an amplitude loop for amplitude modulation of said one of the polar loop system and the polar modulator system.

10. The radio frequency integrated circuit according to claim 7, wherein the demodulated signal processing circuits of the integrated circuit include A/D converters that convert analog signals of the orthogonal demodulated received signals from the output terminals of the mixers for receiving into digital signals, wherein the modulated signal processing circuits of the integrated circuit include D/A converters that convert digital signals of the orthogonal transmission output signals of the modulated signal processing circuits into analog signals, wherein the integrated circuit includes digital interfaces which output the digital orthogonal demodulated received signals to an LSI that performs baseband signal processing and to which the digital orthogonal transmission output signals are supplied from the LSI, wherein the integrated circuit further includes a digital interface reference signal generating unit which generates a digital interface reference signal supplied to the digital interfaces, and wherein the RF test signal generating unit generates the RF test signal using the oscillation output signal of the transmission voltage-controlled oscillator and an output signal of the digital interface reference signal generating units in the calibration mode.

11. The radio frequency integrated circuit according to claim 7, wherein the integrated circuit further includes a system reference voltage-controlled oscillator which generates a system reference signal used when generating the reception local signal and the transmission local signal, and wherein the RF test signal generating unit generates the RF test signal using the oscillation output signal of the transmission voltage-controlled oscillator and the oscillation output signal of the system reference voltage-controlled oscillator in the calibration mode.

12. The radio frequency integrated circuit according to claim 7, wherein the integrated circuit further includes a fractional divider in which a number of frequency divisions includes a fraction and whose input is coupled to an output of the transmission voltage-controlled oscillator, and wherein the RF test signal generating unit generates the RF test signal based on an output of the fractional divider to the input of which the oscillation output signal of the transmission voltage-controlled oscillator is supplied.

13. The radio frequency integrated circuit according to claim 7, wherein the integrated circuit further includes a controlling circuit which controls the transmission voltage-controlled oscillator in the calibration mode, wherein the frequency of the oscillation output signal of the transmission voltage-controlled oscillator is controlled in the calibration mode so as to be lower than that of the oscillation output signal of the transmission voltage-controlled oscillator in the transmission mode of the integrated circuit, in any frequency band among the frequency bands of the multiband radio frequency communications, and wherein, in the calibration mode, the RF test signal generating unit generates, as the RF test signal, the oscillation output signal of the transmission voltage-controlled oscillator which is controlled by the controlling circuit.

* * * * *